(12) United States Patent
Bohnen et al.

(10) Patent No.: US 6,482,902 B1
(45) Date of Patent: Nov. 19, 2002

(54) CATALYST SYSTEM

(75) Inventors: Hans Bohnen, Moers; Cornelia Fritze, Frankfurt, both of (DE)

(73) Assignee: Targor GmbH, Mainz (DE)

( * ) Notice: Subject to any disclaimer, the term of this patent is extended or adjusted under 35 U.S.C. 154(b) by 0 days.

(21) Appl. No.: 09/600,313

(22) PCT Filed: Feb. 5, 1999

(86) PCT No.: PCT/EP99/00725

§ 371 (c)(1),
(2), (4) Date: Jul. 13, 2000

(87) PCT Pub. No.: WO99/40129

PCT Pub. Date: Aug. 12, 1999

(30) Foreign Application Priority Data

Feb. 7, 1998 (DE) .......................................... 198 04 970

(51) Int. Cl.[7] .......................... C08F 4/622; C08F 4/623; C08F 4/629; C08F 4/642
(52) U.S. Cl. ...................... 526/127; 526/129; 526/132; 526/134; 526/139; 526/141; 526/151; 526/153; 526/160; 502/117; 502/121; 502/123; 502/132
(58) Field of Search ................................. 502/117, 121, 502/123, 132; 526/129, 132, 134, 139, 141, 151, 153, 160, 127

(56) References Cited

U.S. PATENT DOCUMENTS

| 5,384,299 A | 1/1995 | Turner et al. |
| 5,547,675 A | 8/1996 | Canich |
| 5,648,440 A | 7/1997 | Sugano et al. |
| 5,817,590 A | 10/1998 | Hasegawa et al. |

FOREIGN PATENT DOCUMENTS

| DE | 197 33 071 A1 | | 2/1999 |
| EP | 0 426 637 A2 | | 5/1991 |
| EP | 0 520 732 A1 | | 12/1992 |
| EP | 0 558 158 A1 | | 9/1993 |
| EP | 601830 A2 | * | 6/1994 |
| EP | 0 601 830 A2 | | 6/1994 |
| EP | 619 626 | | 10/1994 |
| WO | WO 91/09882 | | 7/1991 |
| WO | WO 92/01005 | | 1/1992 |
| WO | WO 93/13140 | | 7/1993 |
| WO | WO96/04319 | * | 2/1996 |
| WO | WO 96/04319 | | 2/1996 |
| WO | WO 97/14700 | | 4/1997 |

OTHER PUBLICATIONS

Britzinger et al. "Stereospezifische Olefinpolymerisation mit chiralen Metallocenkatalysatoren" Angew. Chem No. 107, (1995) pge 1255–1283.
Yang et al. "Cation–like Homogeneous Olefin Polymerization Catalysts Based upon Zyrconocene Alkyls and Tris(pentafluorophenyl) borane", J. Am. Chem. Soc., vol. 113, (1991) pp. 3623–3625.

* cited by examiner

*Primary Examiner*—David W. Wu
*Assistant Examiner*—R. Rabago
(74) *Attorney, Agent, or Firm*—Keil & Weinkauf

(57) ABSTRACT

The present invention relates to a catalyst system comprising metallocene, cocatalyst, support material and, if desired, further organometallic compounds. The catalyst system can advantageously be used for the polymerization of olefins, where the use of aluminoxanes such as methylaluminoxane (MAO), which usually has to be used in a large excess, as cocatalyst can be dispensed with and a high catalyst activity and good polymer morphology are nevertheless achieved.

21 Claims, No Drawings

CATALYST SYSTEM

The present invention describes a catalyst system comprising metallocene, cocatalyst, support material and, if desired, further organometallic compounds. The catalyst system can advantageously be used for the polymerization of olefins, where the use of aluminoxanes such as methylaluminoxane (MAO), which usually has to be used in a large excess, as cocatalyst can be dispensed with and a high catalyst activity and good polymer morphology are nevertheless achieved.

The role of cationic complexes in Ziegler-Natta polymerization using metallocenes is generally recognized (H. H. Brintzinger, D. Fischer, R. Mülhaupt, R. Rieger, R. Waymouth, Angew. Chem. 1995, 107,1255–1283).

The preparation of such cationic alkyl complexes opens up the possibility of obtaining MAO-free catalysts having comparable activity; in this case the cocatalyst can be used in a virtually stoichiometric amount.

The synthesis of "cation-like" metallocene polymerization catalysts is described in J. Am. Chem. Soc. 1991, Volume 113, page 3623.

A process for preparing salts of the formula $LMX^+ XA^-$ by the above-described principle is claimed in EP-A-0,520,732.

EP-A-0,558,158 describes zwitterionic catalyst systems which are prepared from dialkylmetallocene compounds and salts of the formula $[R_3NH]^+[B(C_6H_5)_4]^-$. The reaction of such a salt with, for example, $CP_2ZrMe_2$ gives, as a result of protolysis with elimination of methane, a methylzirconocene cation as intermediate. This reacts further via C—H activation to give the zwitterion $Cp_2Zr^+-(m-C_6H_4)-BPh_3^-$. Here, the Zr atom is covalently bound to a carbon atom of the phenyl ring and is stabilized by means of agostic hydrogen bonds. U.S. Pat. No. 5,348,299 describes zwitterionic catalyst systems which are prepared from dialkylmetallocene compounds and salts of the formula $[R_3NH]^+[B(C_6F_5)_4]^-$ by protolysis. The C—H activation as subsequent reaction does not occur here.

EP-A-0,426,637 utilizes a process in which the Lewis-acid $CPh_3^+$ cation is used for abstracting the methyl group from the metal center. $B(C_6F_5)_4^-$ likewise functions as a weakly coordinating anion.

Industrial utilization of metallocene catalysts requires the catalyst system to be made heterogeneous in order to achieve an appropriate morphology of the resulting polymer. The application of cationic metallocene catalysts based on the abovementioned borate anions to a support is described in WO-91/09882. Here, the catalyst system is formed by applying a dialkylmetallocene compound and a Brönsted acid, quaternary ammonium compound containing a non-coordinating anion such as tetrakispentafluorophenylborate to an inorganic support. The support material is modified beforehand by means of a trialkylaluminum compound. A disadvantage of this method of applying the catalyst to a support is that only a small proportion of the metallocene used is fixed to the support material by physisorption. When the catalyst system is metered into the reactor, the metallocene can easily become detached from the support surface. This leads to a partially homogeneous polymerization which results in an unsatisfactory polymer morphology.

WO-96/04319 describes a catalyst system in which the cocatalyst is covalently bound to the support material. However, this catalyst system has a low polymerization activity and, in addition, the high sensitivity of the supported cationic metallocene catalysts can lead to problems in introducing them into the polymerization system.

It would therefore be desirable to develop a catalyst system which may either be activated before introduction into the reactor or be activated only in the polymerization autoclave.

It is therefore an object of the invention to provide a catalyst system which avoids the disadvantages of the prior art and nevertheless guarantees high polymerization activities and a good polymer morphology. A further object of the invention is to develop a process for preparing this catalyst system, which process makes it possible for the activation of the catalyst system to be carried out either before introduction into the reactor or else only after it has been introduced into the polymerization autoclave.

The present invention provides a supported catalyst system and provides for its use in the polymerization of olefins.

The catalyst system of the invention comprises a) at least one metallocene, b) at least one Lewis base of the formula I,

where
R$^3$, R$^4$ and R$^5$ are identical or different and are each a hydrogen atom, a $C_1$–$C_{20}$-alkyl group, $C_1$–$C_{20}$-haloalkyl group, $C_6$–$C_{40}$-aryl group, $C_6$–$C_{40}$-haloaryl group, $C_7$–$C_{40}$-alkylaryl group or $C_7$–$C_{40}$-arylalkyl group, where two radicals or all three radicals R$^3$, R$^4$ and R$^5$ may be connected to one another via $C_2$–$C_{20}$-units, and M$^2$ is an element of main group V of the Periodic Table of the Elements, c) a support, d) at least one organoboroaluminum compound which is built up of units of the formula II

where
R$^1$ and R$^2$ are identical or different and are each a hydrogen atom, a halogen atom, a $C_1$–$C_{40}$-group, in particular $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl, or R$^1$ is an —OSiR$_3$ group, where R are identical or different and are as defined for R$^1$, M$^3$ are identical or different and are each an element of main group III of the Periodic Table of the Elements and i and j are each an integer 0, 1 or 2, and is covalently bound to the support, and, if desired, e) an organometallic compound of the formula V

where
M$^4$ is an element of main group I, II or III of the Periodic Table of the Elements, R$^6$ are identical or different and are each a hydrogen atom, a halogen atom, a $C_1$–$C_{40}$-group, in particular $C_1$–$C_{20}$-alkyl, $C_6$–$C_{40}$-aryl, $C_7$–$C_{40}$-arylalkyl or $C_7$–$C_{40}$-alkylaryl, p is an integer from 1 to 3 and k is an integer from 1 to 4.

The Lewis bases of the formula (I) are preferably ones in which $M^2$ is nitrogen or phosphorus. Examples of such compounds are triethylamine, triisopropylamine, triisobutylamine, tri(n-butyl)amine, N,N-dimethylaniline, N,N-diethylaniline, N,N-2,4,6-pentamethylaniline, dicyclohexylamine, pyridine, pyrazine, triphenylphosphine, tri(methylphenyl)phosphine and tri(dimethylphenyl) phosphine.

The support is a porous inorganic or organic solid. The support preferably comprises at least one inorganic oxide such as silicon oxide, aluminum oxide, aluminosilicates, zeolites, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ or $Li_2O$, in particular silicon oxide and/or aluminum oxide.

The support can also comprise at least one polymer, e.g. a homopolymer or copolymer, a crosslinked polymer or polymer blend. Examples of polymers are polyethylene, polypropylene, polybutene, polystyrene, divinylbenzene-crosslinked polystyrene, polyvinyl chloride, acrylonitrile-butadiene-styrene copolymer, polyamide, polymethacrylate, polycarbonate, polyester, polyacetal or polyvinyl alcohol.

The support has a specific surface area in the range from 10 to 1000 $m^2$/g, preferably from 150 to 500 $m^2$/g. The mean particle size of the support is from 1 to 500 μm, preferably from 5 to 350 μm, particularly preferably from 10 to 200 μm.

The support is preferably porous with a pore volume of from 0.5 to 4.0 ml/g of support, preferably from 1.0 to 3.5 ml/g. A porous support has a certain proportion of voids (pore volume). The pores are usually irregular in shape, frequently spherical. The pores can be interconnected by small pore openings. The pore diameter is preferably from about 2 to 50 nm. The particle shape of the porous support depends on the after-treatment and can be irregular or spherical. The particle size of the support can be set to any desired value by, for example, cryogenic milling and/or sieving.

The catalyst system of the invention comprises, as cocatalytically active chemical compound, an organoboroaluminum compound comprising units of the formula (II).

Preference is given to compounds of the formula (II) in which $M^3$ is boron or aluminum.

The compound comprising units of the formula (II) can be in the form of a monomer or a linear, cyclic or cage-like oligomer. It is also possible for two or more chemical compounds comprising units of the formula (II) to form dimers, trimers or higher associates by means of Lewis acid-base interactions or condensation reactions.

Preferred cocatalytically active organoboroaluminum compounds d) correspond to the formulae (III) and (IV),

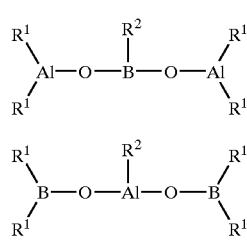

where $R^1$ and $R^2$ are as defined under formula (II).

Examples of cocatalytically active compounds of the formulae (III) and (IV) are

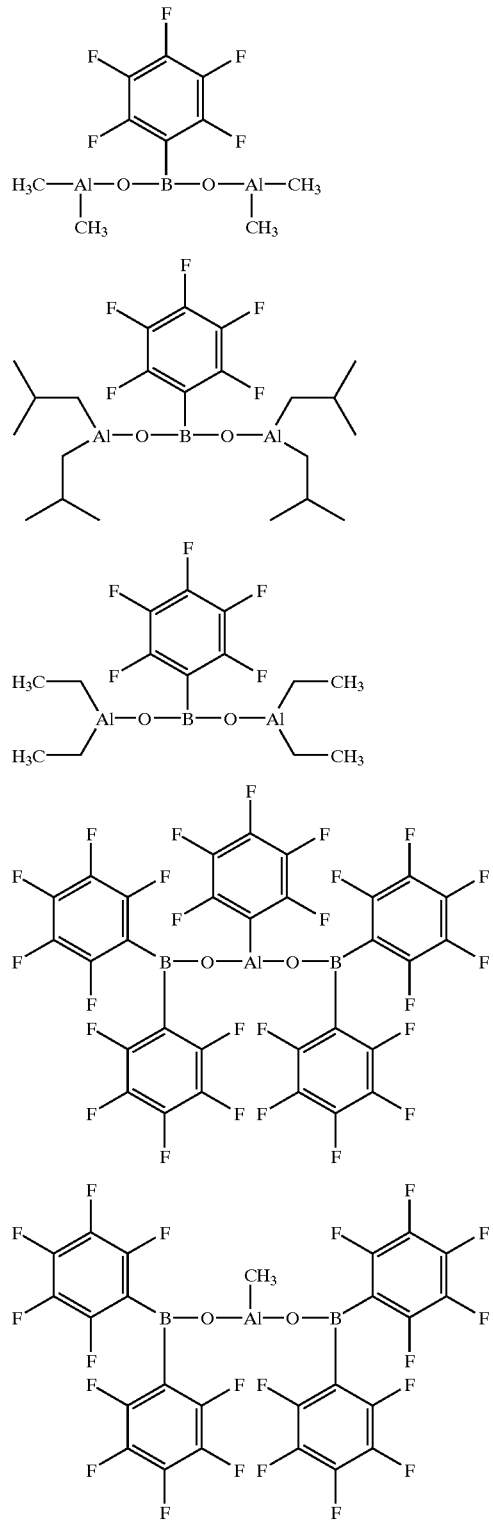

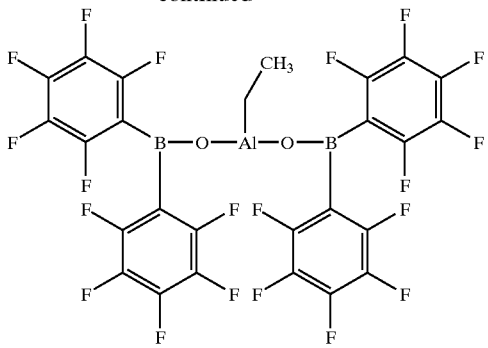

The organometallic compounds of the formula (V) are preferably uncharged Lewis acids in which $M^4$ is lithium, magnesium and/or aluminum, in particular aluminum. Examples of preferred organometallic compounds of the formula (V) are trimethylaluminum, triethylaluminum, triisopropylaluminum, trihexylaluminum, trioctylaluminum, tri-n-butylaluminum, tri-n-propylaluminum, triisoprenylaluminum, dimethylaluminum monochloride, diethylalumninum monochioride, diisobutylaluminum monochloride, methylaluminum sesquichloride, ethylaluminum sesquichloride, dimethylaluminum hydride, diethylaluminum hydride, diisopropylaluminum hydride, dimethylaluminum trimethylsiloxide, dimethylaluminum triethylsiloxide, phenylalane, pentafluorophenylalane and o-tolylalane.

The metallocene compounds present in the catalyst system of the invention can be, for example, bridged or unbridged biscyclopentadienyl complexes which are described, for example, in EP-A-0,129,368, EP-A-0,561,479, EP-A-0,545,304 and EP-A-0,576,970, monocyclopentadienyl complexes such as bridged amidocyclopentadienyl complexes which are described, for example, in EP-A-0,416,815, multinuclear cyclopentadienyl complexes as described, for example, in EP-A-0,632,063, p-ligand-substituted tetrahydropentalenes as described, for example, in EP-A-0,659,758 or p-ligand-substituted tetrahydroindenes as described, for example, in EP-A-0,661,300.

It is also possible to use organometallic compounds in which the complexing ligand does not contain a cyclopentadienyl ligand. Examples are diamine complexes of transition groups III and IV of the Periodic Table of the Elements, as are described, for example, in D.H. McConville, et al., Macromolecules, 1996, 29, 5241 and D.H. McConville, et al., J. Am. Chem. Soc., 1996, 118, 10008. It is also possible to use diimine complexes of transition group VIII of the Periodic Table of the Elements (e.g. $Ni^{2+}$ or $Pd^{2+}$ complexes), as are described in Brookhart et al., J. Am. Chem. Soc., 1995, 117, 6414 and Brookhart et al., J. Am. Chem. Soc., 1996, 118, 267.

Furthermore, 2,6-bis(imino)pyridyl complexes of transition group VIII of the Periodic Table of the Elements (e.g. $Co^{2+}$ or $Fe^{2+}$ complexes), as are described in Brookhart et al., J. Am. Chem. Soc., 1998, 120, 4049 and Gibson et al., Chem. Commun. 1998, 849, can be used. Metallocene compounds whose complexing ligand contains heterocycles can be also used. Examples are described in WO 98/22486.

Preferred metallocene compounds are unbridged or bridged compounds of the formula VI,

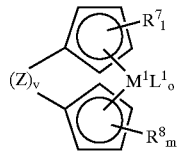

where
- $M^1$ is a metal of transition group III, IV, V or VI of the Periodic Table of the Elements, in particular Ti, Zr or Hf,
- $R^7$ are identical or different and are each a hydrogen atom or $SiR_3^{12}$, where $R^{12}$ are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^7$ are each a $C_1$–$C_{30}$-group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorine-containing $C_1$–$C_{25}$-alkyl; fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^7$ can be connected to one another such that the radicals $R^7$ and the atoms of the cyclopentadienyl ring which connect them form a carbocyclic or heterocyclic $C_4$–$C_{24}$-ring system which may in turn be substituted,
- $R^8$ are identical or different and are each a hydrogen atom or $SiR_3^{12}$, where $R^{12}$ are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^8$ are each a $C_1$–$C_{30}$-group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^8$ can be connected to one another such that the radicals $R^8$ and the atoms of the cyclopentadienyl ring which connect them form a carbocyclic or heterocyclic $C_4$–$C_{24}$-ring system which may in turn be substituted,
- l is 5 when v=0, and l is 4 when v=1,
- m is 5 when v=0, and m is 4 when v=1,
- $L^1$ can be identical or different and are each a hydrogen atom, a $C_1$–$C_{10}$-hydrocarbon group such as $C_1$–$C_{10}$-alkyl or $C_6$–$C_{10}$-aryl, a halogen atom or $OR^9$, $SR^9$, $OSiR_3^9$, $SiR_3^9$, $PR_2^9$ or $NR_2^9$, where $R^9$ is a halogen atom, a $C_1$–$C_{10}$ alkyl group, a halogenated $C_1$–$C_{10}$-alkyl group, a $C_6$–$C_{20}$-aryl group or a halogenated $C_6$–$C_{20}$-aryl group, or $L^1$ are each a toluenesulfonyl, trifluoroacetyl, trifluoroacetoxyl, trifluoromethanesulfonyl, nonafluorobutanesulfonyl or 2,2,2-trifluoroethanesulfonyl group,
- o is an integer from 1 to 4, preferably 2,
- Z is a bridging structural element between the two cyclopentadienyl rings and v is 0 or 1.

Examples of Z are $MR^{10}R^{11}$ groups, where M is carbon, silicon, germanium or tin and $R^{10}$ and $R^{11}$ are identical or different $C_1$–$C_{20}$-hydrocarbon-containing groups such as $C_1$–$C_{10}$-alkyl, $C_6$–$C_{14}$-aryl or trimethylsilyl. Z is preferably $CH_2$, $CH_2CH_2$, $CH(CH_3)CH_2$, $CH(C_4H_9)C(CH_3)_2$, $C(CH_3)_2$, $(CH_3)_2Si$, $(CH_3)_2$ Ge, $(CH_3)_2$, Sn, $(C_6H_5)_2Si$, $(C_6H_5)(CH_3)Si$, $(C_6H_5)_2$ Ge, $(C_6H_5)_2Sn$, $(CH_2)_4Si$, $CH_2Si(CH_3)_2$, o—$C_6H_4$ or $2,2'$-$(C_6H_4)_2$. It is also possible for Z together with one or more radicals $R^7$ and/or $R^8$ to form a monocyclic or polycyclic ring system.

Preference is given to chiral, bridged metallocene compounds of the formula (VI), in particular those in which v is 1 and one or both cyclopentadienyl rings are substituted such that they form an indenyl ring, a sulfur-, nitrogen- or oxygen-containing heterocycle analogous to indenyl or a sulfur-, nitrogen- or oxygen-containing heterocylce analagous to pentalene.

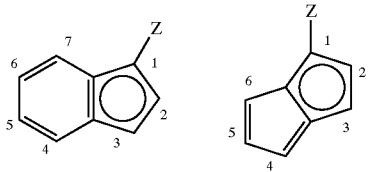

(VII)

The abovementioned rings are preferably substituted, in particular (using the numbering given in formula (VII)) in the 2, 4, 2,4, 2,4,5, 2,4,6, 2,4,7 or 2,4,5,6 positions, by $C_1$–$C_{20}$-groups such as $C_1$–$C_{10}$-alkyl or $C_6$–$C_{20}$-aryl, where two or more substituents on the rings mentioned can also together form a ring system.

Chiral, bridged metallocene compounds of the formula (VI) can be used as pure racemic or pure meso compounds. However, it is also possible to use mixtures of a racemic compound and a meso compound.

Examples of metallocene compounds are:
dimethylsilanediylbis(indenyl)zirconium dichloride
dimethylsilanediylbis(4-naphthylindenyl)zirconium dichloride
dimethylsilanediylbis(2-methylbenzindenyl)zirconium dichloride
dimethylsilanediylbis(2-methylindenyl)zirconium dichloride
dimethylsilanediylbis(2-methyl4-(1-naphthyl)indenyl)zirconium dichloride
dimethylsilanediylbis(2-methyl4-(2-naphthyl)indenyl)zirconium dichloride
dimethylsilanediylbis(2-methyl4-phenylindenyl)zirconium dichloride
dimethylsilanediylbis(2-methyl4-t-butylindenyl)zirconium dichloride
dimethylsilanediylbis(2-methyl4-isopropylindenyl)zirconium dichloride
dimethylsilanediylbis(2-methyl4-ethylindenyl)zirconium dichloride
dimethyisilanediylbis(2-methyl4-acenaphthindenyl)zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl4-ethylindenyl)zirconium dichloride
dimethylsilanediylbis(2-ethyl4-phenylindenyl)zirconium dichloride
dimethylsilanediylbis(2-methyl-4,5-benzindenyl)zirconium dichloride
dimethylsilanediylbis(2-methyl4,6-diisopropylindenyl)zirconium dichloride
dimethylsilanediylbis(2-methyl4,5-diisopropylindenyl)zirconium dichloride
dimethylsilanediylbis(2,4,6-trimethylindenyl)zirconium dichloride
dimethylsilahediylbis(2,5,6-trimethylindenyl)zirconium dichloride
dimethylsilanediylbis(2,4,7-trimethylindenyl)zirconium dichloride
dimethylsilanediylbis(2-methyl-5-isobutylindenyl)zirconium dichloride
dimethylsilanediylbis(2-methyl-5-t-butylindenyl)zirconium dichloride
methyl(phenyl)silanediylbis(2-methyl-4-phenylindenyl)zirconium dichloride
methyl(phenyl)silanediylbis(2-methyl-4,6-diisopropylindenyl)zirconium dichloride
methyl(phenyl)silanediylbis(2methyl-4-isopropylindenyl)zirconium dichioride
methyl(phenyl)silanediylbis(2-methyl-4,5-benzindenyl)zirconium dichloride
methyl(phenyl)silanediylbis(2-methyl-4,5-(methylbenz)indenyl)zirenonuiu dichloride
methyl(phenyl)silanediylbis(2-methyl-4,5-(tetramethylbenz)indenyl)zirconium dichloride
methyl(phenyl)silanediylbis(2-methyl-4-acenaphthindenyl)zirconium dichloride
methyl(phenyl)silanediylbis(2-methylindenyl)zirconium dichloride
methyl(phenyl)silanediylbis(2-methyl-5-isobutylindenyl)zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6-diisopropylindenyl)zirconium dichloride
1,4-butanediylbis(2-methyl-4-isopropylindenyl)zirconium dichloride
1,4-butanediylbis(2-methyl-4,5-benzindenyl)zirconium dichloride
1,2-ethanediylbis(2-methyl-4,5-benzindenyl)zirconium dichloride
1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride
[4-($\eta^5$-cyclopentadienyl)4,6,6-trimethyl($\eta^5$-4,5-tetrahydropentalene)]-dichlorozirconium
[4-($\eta^5$-3'-trimethylsilylcyclopentadienyl)-4,6,6-trimethyl($\eta^5$-4,5-tetrahydropentalene)]-dichlorozirconium
(4-($\eta^5$-3'-isopropylcyclopentadienyl)-4,6,6-trimethyl($\eta^5$-4,5-tetrahydropentalene)]-dichlorozirconium
[4-($\eta^5$-cyclopentadienyl)-4,7,7-trimethyl($\eta^5$-4,5,6,7-tetrahydroindenyl)]dichlorotitanium
[4-($\eta^5$-cyclopentadienyl)-4,7,7-trimethyl($\eta^5$-4,5,6,7-tetrahydroindenyl)]-dichlorozirconium

[4-(η⁵-cyclopentadienyl)-4,7,7-trimethyl(η⁵-4,5,6,7-tetrahydroindenyl)]-dichlorohafnium
[4-(η⁵-3-tert-butylcyclopentadienyl)-4,7,7-trimethyl(η⁵-4,5,6,7-tetrahydroindenyl)]dichlorotitanium
4-(η⁵-3-isopropylcyclopentadienyl)-4,7,7-trimethyl(η⁵-4,5,6,7-tetrahydroindenyl)]dichlorotitanium
4-(η⁵-3-methylcyclopentadienyl)-4,7,7-trimethyl(η⁵-4,5,6,7-tetrahydroindenyl)]dichlorotitanium
4-(η⁵-3-trimethysilylcyclopentadienyl)-2-trimethylsilyl-4,7,7-trimethyl(η⁵-4,5,6,7-tetrahydroindenyl)]dichlorotitanium
4-(η⁵-3-tert-butylcyclopentadienyl)-4,7,7-trimethyl(η⁵-4,5,6,7-tetrahydroindenyl)]dichlorozirconium
(tert-butylamido)(tetramethyl-η⁵-cyclopentadienyl)dimethylsilyidichlorotitanium
(tert-butylamido)(tetramethyl-η⁵-cyclopentadienyl)-1,2-ethanediyidichlorotitanium
(methylamido)(tetramethyl-η⁵-cyclopentadienyl)dimethylsilyidichlorotitanium
(methylamido)(tetramethyl-η⁵-cyclopentadienyl)-1,2-ethanediyldichlorotitanium
(tert-butylamido)(2,4-dimethyl-2,4-pentadien-1-yl)dimethylsilyidichlorotitanium
bis(cyclopentadienyl)zirconium dichloride
bis(n-butylcyclopentadienyl)zirconium dichloride
bis(1,3-dimethylcyclopentadienyl)zirconium dichloride
tetrachloro[1-[bis(η⁵-1H-inden-1-ylidene)methylsilyl]-3-η⁵-cyclopenta-2,4-dien-1-ylidene)-3-η⁵-9H-fluoren-9-ylidene)butane]dizirconium
tetrachloro[2-[bis(η⁵-2-methyl-1H-inden-1-ylidene)methoxysilyl]-5-η⁵-2,3,4,5-tetramethylcyclopenta-2,4-dien-1-ylidene)-5-(η⁵-9H-fluoren-9-ylidene)hexane]dizirconium
tetrachloro[1-(bis(η⁵-1H-inden-1-ylidene)methylsilyl]-6-(η⁵-cyclopenta-2,4-dien-1-ylidene)-6-(η⁵-9H-fluoren-9-ylidene)-3-oxaheptane]dizirconium
dimethylsilanediyibis(2-methyl-4-(4'-tert-butylphenylindenyl)zirconium dichloride
dimethylsilanediylbis(2-methyl-4-(4'-methylphenylindenyl)zirconium dichloride
dimethylsilanediylbis(2-methyl-4-(4'-ethylphenylindenyl)zirconium dichloride
dimethylsilanediylbis(2-methyl-4-(4'-trifuoromethylphenylindenyl)zirconium dichloride
dimethylsilanediylbis(2-methyl-4-(4'-methoxyphenylindenyl)zirconium dichloride
dimethylsilanediylbis(2-ethyl4-(4'-tert-butylphenylindenyl)zirconium dichloride
dimethylsilanediylbis(2-ethyl4-(4'-methylphenylindenyl)zirconium dichloride
dimethylsilanediylbis(2-ethyl4-(4'-ethylphenylindenyl)zirconium dichloride
dimethylsilanediylbis(2-ethyl4-(4'-trifuoromethylphenylindenyl)zirconium dichloride
dimethylsilanediylbis(2-ethyl4-(4'-methoxyphenylindenyl)zirconium dichloride
dimethylsilanediylbis(2-methyl-4-(4'-tert-butylphenylindenyl)dimethyl-zirconium
dimethylsilanediylbis(2-methyl-4-(4'-methylphenylindenyl)dimethylzirconium
dimethylsilanediylbis(2-methyl-4-(4'-ethylphenylindenyl)dimethylzirconium
dimethylsilanediylbis(2-methyl-4-(4'-trifluoromethylphenylindenyl)dimethylzirconium
dimethylsilanediylbis(2-methyl-4-(4'-methoxyphenylindenyl)dimethylzirconium
dimethylsilanediylbis(2-ethyl-4-(4'-tert-butylphenylindenyl)dimethylzirconium
dimethylsilanediylbis(2-ethyl4-(4'-methylphenylindenyl)dimethylzirconium
dimethylsilanediylbis(2-ethyl4-(4'-ethylphenylindenyl)dimethylzirconium
dimethylsilanediylbis(2-ethyl4-(4'-trifluoromethylphenylindenyl)dimethylzirconium
dimethylsilanediylbis(2-ethyl4-(4'-methoxyphenylindenyl)dimethyizirconium
dimethylsilanediylbis(2-methyl-4-(4'-trimethylsilylphenylindenyl)zirconium dichloride
dimethylsilanediylbis(2-methyl-4-(4'-trimethylsilylphenylindenyl)dimethyizirconium
dimethylsilanediylbis(2-ethyl4-(4'-trimethylsilyiphenylindenyl)zirconium dichloride
dimethylsilanediylbis(2-methyl-4-(4'-tert-butylphenyl)indenyl)hafnium dichloride
dimethylsilanediylbis(2-methyl-4-(4'-tert-butylphenyl)indenyl)titanium dichloride
dimethylsilanediylbis(2-methyl-4-(4'-methylphenyl)indenyl)zircnium dichloride
dimethylsilanediylbis(2methyl-4-(4'-n-propylphenyl)indenyl)zirconium dichloride
dimethylsilanediylbis(2methyl-4-(4'-n-butylphenyl)indenyl)zirconium dichloride
dimethylsilanediylbis(2-methyl-4-(4'-hexylphenyl)indenyl)zirconium dichloride
dimethylsilanediylbis(2-methyl-4-(4'-n-butylphenyl)indenyl)zirconium dichloride
dimethylsilanediylbis(2-ethyl-4-phenylindenyl)zirconium dichloride
dimethylsilanediylbis(2-ethyl-4-(4'-metylphenyl)indenyl)zirconium dichloride
dimethylsilanediylbis(2-ethyl-4-phenylindenyl)zirconium dichloride
dimethylsilanediylbis(2-ethyl-4-(4'-ethylphenyl)indenyl)zirconium dichloride
dimethylsilanediylbis(2-ethyl-4-(4'-n tylphenyl)indenyl)zirconium dichloride
dimethylsilanediylbis(2-ethyl-4-(4'-hexyiphenyl)indenyl)zirconium dichloride
dimethylsilanediylbis(2-ethyl-4-(4'-exylpheny)indenyl)zirconium dichloride
dimethyisilanediyibis(2-ethyl-4-(4'-entylphenyl)indenyl)zirconium dichloride
dimethylsilanediylbis(2-ethyl-4-(4'-cyclohexylphenyl)indenyl)zirconium dichloride
dimethylsilanediylbis(2-ethyl-4-(4'-sec-butylphenyl)indenyl)zirconium dichioride
dimethylsilanediylbis(2-ethyl-4-(4'-tert-butylphenyl)indenyl)zirconium dichloride
dimethylsilanediylbis(2-n-propyl-4-phenyl)indenyl)zirconium dichloride
dimethylsilanediylbis(2-n-propyl-4-(4'-methylphenyl)indenyl)zirconium dichloride
dimethylsilanediylbis(2-n-propyl-4-(4'-ethylphenyl)indenyl)zirconium dichloride dimethylsilanediylbis(2-n-propyl-4-(4'-iso-propylphenyl)indenyl)zirconium dichloride
dimethylsilanediylbis(2-n-propyl-4-(4'-n-butylphenyl)indenyl)zirconium dichloride
dimethylsilanediylbis(2-n-propyl-4-(4'-hexylphenyl)indenyl)zirconium dichloride
dimethylsilanediylbis(2-n-propyl-4-(4'-cyclohexylphenyl)indenyl)zirconium dichloride
dimethylsilanediylbis(2-n-propyl-4-(4'-sec-butphenyl)indenyl)zirconium dichloride
dimethylsilanediylbis(2-n-propyl-4-(4'-tert-butylphenyl)indenyl)zirconium dichloride
dimethylsilanediylbis(2-n-butyl-4-phenyl)indenyl)zirconium dichloride
dimethylsilanediylbis(2-n-butyl-4-(4'-methylphenyl)indenyl)zirconium dichloride
dimethylsilanediylbis(2-n-butyl-4-(4'-ethylphenyl)indenyl)zirconium dichloride
dimethylsilanediylbis(2-n-butyl-4-(4'-n-propylphenyl)indenyl)zirconium dichloride
dimethylsilanediylbis(2-n-butyl-4-(4'-isopropylphenyl)indenyl)zirconium dichloride
dimethylsilanediylbis(2-n-butyl-4-(4'-n-butylphenyl)indenyl)zirconium dichloride
dimethylsilanediylbis(2-n-butyl-4-(4'-hexylphenyl)indenyl)zirconium dichloride
dimethylsilanediylbis(2-n-butyl-4-(4'-cyclohexylphenyl)indenyl)zirconium dichloride
dimethylsilanediylbis(2-n-butyl-4-(4'-sec-butylphenyl)indenyl)zirconium dichloride
dimethylsilanediylbis(2-n-butyl-4-(4'-tert-butylphenyl)indenyl)zirconium dichloride
dimethylsilanediylbis(2-hexyl-4-phenyl)indenyl)zirconium dichloride
dimethylsilanediylbis(2-hexyl-4-(4'-methylphenyl)indenyl)zirconium dichloride
dimethylsilanediylbis(2-hexyl-4-(4'-ethylphenyl)indenyl)zirconium dichloride
dimethylsilanediylbis(2-hexyl-4-(4'-n-propylphenyl)indenyl)zirconium dichloride
dimethylsilanediylbis(2-hexyl-4-(4'-isopropylphenyl)indenyl)zirconium dichloride
dimethylsilanediylbis(2-hexyl-4-(4'-n-butylphenyl)indenyl)zirconium dichloride
dimethylsilanediyibis(2-hexyl-4-(4'-hexylphenyl)indenyl)zirconium dichloride
dimethylsilanediylbis(2-hexyl-4-(4'-cyclohexylphenyl)indenyl)zirconium dichloride
dimethylsilanediylbis(2-hexyl-4-(4'-sec-butylphenyl)indenyl)zirconium dichloride
dimethylsilanediylbis(2-hexyl-4-(4'-tert-butylphenyl)indenyl)zirconium dichloride
dimethylsilanediylbis(2-methyl-4-(4'-tert-butylphenyl)indenyl)zirconium bis(dimethylamide)
dimethylsilanediylbis(2-ethyl-4-(4'-tert-butylphenyl)indenyl)dibenzylzirconium
dimethylsilanediylbis(2-methyl-4-(4'-tert-butylphenyl)indenyl)dimethylzirconium
dimethylgermanediylbis(2-ethyl-4-(4'-tert-butylphenyl)indenyl)zirconium dichloride
dimethylgermanediylbis(2-ethyl-4-(4'-tert-butylphenyl)indenyl)hafnium dichloride
dimethylgermanediylbis(2-propyl-4-(4'-tert-butylphenyl)indenyl)titanium dichloride
dimethylgermanediylbis(2-methyl-4-(4'-tert-butylphenyl)indenyl)zirconium dichloride
ethylidenebis(2-ethyl-4-phenyl)indenyl)zirconium dichloride
ethylidenebis(2-ethyl-4-(4'-tert-butylphenyl)indenyl)zirconium dichloride
ethylidenebis(2-n-propyl-4-(4'-tert-butylphenyl)indenyl)zirconium dichloride
ethylidenebis(2-n-butyl-4-(4'-tert-butylphenyl)indenyl)titanium dichloride
ethylidenebis(2-hexyl-4-(4'-tert-butylphenyl)indenyl)dibenzylzirconium
ethylidenebis(2-ethyl-4-(4'-tert-butylphenyl)indenyl)dibenzylhafnium
ethylidenebis(2-methyl-4-(4'-tert-butylphenyl)indenyl)dibenzyltitanium
ethylidenebis(2-methyl-4-(4'-tert-butylphenyl)indenyl)zirconium dichloride
ethylidenebis(2-ethyl-4-(4'-tert-butylphenyl)indenyl)dimethylhafnium
ethylidenebis(2-n-propyl-4-phenyl)indenyl)dimethyltitanium
ethylidenebis(2-ethyl-4-(4'-tert-butylphenyl)indenyl)zirconium bis(dimethylamide)
ethylidenebis(2-ethyl-4-(4'-tert-butylphenyl)indenyl)hafnium bis(dimethylamide)
ethylidenebis(2-ethyl-4-(4'-tert-butylphenyl)indenyl)titanium bis(dimethylamide)
methylethylidenebis(2-ethyl-4-(4'-tert-butylphenyl)indenyl)zirconium dichloride
methylethylidenebis(2-ethyl-4-(4'-tert-butylphenyl)indenyl)hafnium dichloride
phenylphosphinediyl(2-ethyl-4-(4'-tert-butylphenyl)indenyl)zirconium dichloride
phenylphosphinediyl(2-methyl-4-(4'-tert-butylphenyl)indenyl)zirconium dichloride
phenylphosphinediyl(2-ethyl-4-(4'-tert-butylphenyl)indenyl)zirconium dichloride
dimethylsilanediyl(2-methyl-4-azapentalene)(2-methyl-4-(4'-methylphenylindenyl)zirconium dichloride
dimethylsilanediyl(2-methyl-5-azapentalene)(2-methyl-4-(4'-methylphenylindenyl)zirconium dichloride
dimethylsilanediyl(2-methyl-6-azapentalene)(2-methyl-4-(4'-methylphenylindenyl)zirconium dichloride
dimethylsilanediyl(2-methyl-N-phenyl-4-azapentalene)(2-methyl-4-(4'-methylphenylindenyl)zirconium dichloride
dimethylsitanediyl(2-methyl-N-phenyl-5-azapentalene)(2-methyl-4-(4'-methylphenylindenyl)zirconium dichloride
dimethylsilanediyl(2-methyl-N-phenyl-6-azapentalene)(2-methyl-4-(4'-methylphenylindenyl)zirconium dichloride
dimethylsilanediyl(2,5-dimethyl-4-azapentalene)(2-methyl-4-(4'-methylphenylindenyl)zirconium dichloride
dimethylsilanediyl(2,5-dimethyl-4-azapentalene)(2-methyl-4-(4'-methylphenylindenyl)zirconium dichloride
dimethylsilanediyl(2,5-dimethyl-N-phenyl-4-azapentalene)(2-methyl-4-(4'-methylphenylindenyl)zirconium dichloride dimethylsilanediyl(2,5-dimethyl-N-phenyl-6-azapentalene)(2-methyl-4-(4'-methylphenylindenyl)zirconium dichloride
dimethylsilanediyl(2-methyl-4-thiapentalene)(2-methyl-4-(4'-methylphenylindenyl)zirconium dichloride
dimethylsilanediyl(2-methyl-5-thiapentalene)(2-methyl-4-(4'-methylphenylindenyl)zirconium dichloride
dimethylsilanediyl(2-methyl-6-thiapentalene)(2-methyl-4-(4'-methylphenylindenyl)zirconium dichloride
dimethylsilanediyl(2,5-dimethyl-4-thiapentalene)(2-methyl-4-(4'-methylphenylindenyl)zirconium dichloride
dimethylsilanediyl(2,5-dimethyl-6-thiapentalene)(2-methyl-4-(4'-methylphenylindenyl)zirconium dichloride
dimethylsilanediyl(2-methyl-4-oxapentalene)(2-methyl-4-(4'-methylphenylindenyl)zirconium dichloride
dimethylsilanediyl(2-methyl-5-oxapentalene)(2-methyl-4-(4'-methylphenylindenyl)zirconium dichloride
dimethylsilanediyl(2-methyl-6-oxapentalene)(2-methyl-4-(4'-methylphenylindenyl)zirconium dichloride
dimethylsilanediyl(2,5-dimethyl-4-oxapentalene)(2-methyl-4-(4'-methylphenylindenyl)zirconium dichloride
dimethylsilanediyl(2,5-dimethyl-6-oxapentalene)(2-methyl-4-(4'-methylphenylindenyl)zirconium dichloride
dimethylsilanediyl(2-methyl-4-azapentalene)(2-methyl-4-(4'-ethylphenylindenyl)zirconium dichloride
dimethylsilanediyl(2-methyl-5-azapentalene)(2-methyl-4-(4'-ethylphenylindenyl)zirconium dichloride
dimethylsilanediyl(2-methyl-6-azapentalene)(2-methyl-4-(4'-ethylphenylindenyl)zirconium dichloride
dimethylsilanediyl(2-methyl-N-phenyl-4-azapentalene)(2-methyl-4-(4'-ethylphenylindenyl)zirconium dichloride
dimethylsilanediyl(2-methyl-N-phenyl-5-azapentalene)(2-methyl-4-(4'-ethylphenylindenyl)zirconium dichloride
dimethylsilanediyl(2-methyl-N-phenyl-6-azapentalene)(2-methyl-4-(4'-ethylphenylindenyl)zirconium dichloride
dimethylsilanediyl(2,5-dimethyl-4-azapentalene)(2-methyl-4-(4'-ethylphenylindenyl)zirconium dichloride
dimethylsilanediyl(2,5-dimethyl-6-azapentalene)(2-methyl-4-(4'-ethylphenylindenyl)zirconium dichloride
dimethylsilanediyl(2,5-dimethyl-N-phenyl-4-azapentaiene)(2-methyl-4-(4'-ethylphenylindenyl)zirconium dichloride
dimethylsilanediyl(2,5-dimethyl-N-phenyl-6-azapentalene)(2-methyl-4-(4'-ethylphenylindenyl)zirconium dichloride
dimethylsilanediyl(2-methyl-4-thiapentalene)(2-methyl-4-(4'-ethylphenylindenyl)zirconium dichloride
dimethylsilanediyl(2-methyl-5-thiapentalene)(2-methyl-4-(4'-ethylphenylindenyl)zirconium dichloride
dimethylsilanediyl(2-methyl-6-thiapentalene)(2-methyl-4-(4'-ethylphenylindenyl)zirconium dichloride
dimethylsilanediyl(2,5-dimethyl-4-thiapentalene)(2-methy-4-(4'-ethylphenylindenyl)zirconium dichloride
dimethylsilanediyl(2,5-dimethyl-6-thiapentalene)(2-methyl-4-(4'-ethylphenylindenyl)zirconium dichloride
dimethylsilanediyl(2-methyl-4-oxapentalene)(2-methyl-4-(4'-ethylphenylindenyl)zirconium dichloride
dimethylsilanediyl(2-methyl-5-oxapentalene)(2-methyl-4-(4'-ethylphenylindenyl)zirconium dichloride
dimethylsilanediyl(2-methyl-6-oxapentalene)(2-methyl-4-(4'-ethylphenylindenyl)zirconium dichloride
dimethylsilanediyl(2,5-dimethyl-4-oxapentalene)(2-methyl-4-(4'-ethyl-phenylindenyl)zirconium dichloride
dimethylsilanediyl(2,5-dimethyl-6-oxapentalene)(2-methyl-4-(4'-ethylphenylindenyl)zirconium dichloride
dimethylsilanediyl(2-methyl-4-azapentalene)(2-methyl-4-(4'-n-propylphenylindenyl)zirconium dichloride
dimethylsilanediyl(2-methyl-5-azapentalene)(2-methyl-4-(4'-n-propylphenylindenyl)zirconium dichloride
dimethylsilanediyl(2-methyl-6-azapentalene)(2-methyl-4-(4'-n-propylphenylindenyl)zirconium dichloride
dimethylsilanediyl(2-methyl-N-phenyl-4-azapentalene)(2-methyl-4-(4'-n-propylphenylindenyl)zirconium dichloride
dimethylsilanediyl(2-methyl-N-phenyl-5-azapentalene)(2-methyl-4-(4'-n-propylphenylindenyl)zirconium dichloride dimethylsilanediyl(2-methyl-N-phenyl-6-azapentalene)(2-methyl-4-(4'-n-propylphenylindenyl)zirconium dichloride
dimethylsilanediyl(2,5-dimethyl-N-azapentalene)(2-methyl-4-(4'-n-propylphenylindenyl)zirconium dichloride
dimethylsilanediyl(2,5-dimethyl-6-azapentalene)(2-methyl-4-(4'-n-propyphenylindenyl)zirconium dichloride
dimethylsilanediyl(2,5-dimethyl-N-phenyl-4-azapentalene)(2-methyl-4-(4'-n-propylphenylindenyl)zirconium dichloride
dimethylsilanediyl(2,5-dimethyl-N-phenyl-6-azapentalene)(2-methyl-4-(4'-n-propylphenylindenyl)zirconium dichloride
dimethylsilanediyl(2-methyl-4-thiapentalene)(2-methyl-4-(4'-n-propylphenylindenyl)zirconium dichloride
dimethylsilanediyl(2-methyl-5-thiapentalene)(2-methyl-4-(4'-n-propylphenylindenyl)zirconium dichioride
dimethylsilanediyl(2-methyl-6-thiapentalene)(2-methyl-4-(4'-n-propylphenylindenyl)zirconium dichloride
dimethylsilanediyl(2,5-dimethyl-4-thiapentalene)(2-methyl-4-(4'-n-propylphenylindenyl)zirconium dichloride
dimethylsilanediyl(2,5-dimethyl-6-thiapentalene)(2-methyl-4-(4'-n-propylphenylindenyl)zirconium dichloride
dimethylsilanediyl(2-methyl-4-oxapentalene)(2-methyl-4-(4'-n-propylphenylindenyl)zirconium dichloride
dimethylsilanediyl(2-methyl-5-oxapentalene)(2-methyl-4-(4'-n-propylphenylindenyl)zirconium dichloride
dimethylsilanediyl(2-methyl-6-oxapentalene)(2-methyl-4-(4'-n-propylphenylindenyl)zirconium dichloride
dimethylsilanediyl(2,5-dimethyl-4-oxapentalene)(2-methyl-4-(4'-n-propylphenylindenyl)zirconium dichloride
dimethylsilanediyl(2,5-dimethyl-6-oxapentalene)(2-methyl-4-(4'-n-propylphenylindenyl)zirconium dichloride
dimethylsilanediyl(2-methyl-4-azapentalene)(2-methyl-4-(4'-isopropylphenylindenyl)zirconium dichloride
dimethylsilanediyl(2-methyl-5-azapentalene)(2-methyl-4-(4'-isopropylphenylindenyl)zirconium dichloride dimethylsilanediyl(2-methyl-6-azapentalene)(2-methyl-4-(4'-isopropylphenylindenyl)zirconium dichloride
dimethylsilanediyl(2-methyl-N-pheny(-4-azapentalene)(2-methyl-4-(4'-isopropylphenylindenyl)zirconium dichloride
dimethylsilanediyl(2-methyl-N-phenyl-5-azapentalene)(2-methyl-4-(4'-isopropylphenylindenyl)zirconium dichloride
dimethyisilanediyl(2-methyl-N-phenyl-6-azapentalene)(2-methyl-4-(4'-isopropylphenylindenyl)zirconium dichloride
dimethylsilanediyl(2,5-dimethyl-4-azapentalene)(2-methyl-4-(4'-isopropylphenylindenyl)zirconium dichloride
dimethylsilanediy(2,5-dimethyl-6-azapentalene)(2-methyl-4-(4'-isopropylphenylindenyl)zirconium dichloride
dimethylsilanediyl(2,5-dimethyl-N-phenyl-4-azapentalene)(2-methyl-4-(4'-isopropylphenylindenyl)zirconium dichloride
dimethylsilanediyl(2,5-dimethyl-N-phenyl-6-azapentalene)(2-methyl-4-(4'-isopropylphenylindenyl)zirconium dichloride
dimethylsilanediyl(2-methyl-4-thiapentalene)(2-methyl-4-(4'-isopropylphenylindenyl)zirconium dichloride
dimethylsilanediyl(2-methyl-5-thiapentalene)(2-methyl-4-(4'-isopropylphenylindenyl)zirconium dichloride
dimethylsilanediyl(2-methyl-6-thiapentalene)(2-methyl-4-(4'-isopropylphenylindenyl)zirconium dichloride
dimethylsilanediyl(2,5-dimethyl-4-thiapentalene)(2-methyl-4-(4'-isopropylphenylindenyl)zirconium dichloride
dimethylsilanediyl(2,5-dimethyl-6-thiapentalene)(2-methyl-4-(4'-isopropylphenylindenyl)zirconium dichloride
dimethylsilanediyl(2-methyl-4-oxapentalene)(2-methyl-4-(4'-isopropylphenylindenyl)zirconium dichloride
dimethylsilanediyl(2-methyl-5-oxapentalene)(2-methyl-4-(4'-isopropylpheny(indenyl)zirconium dichloride
dimethylsilanediyl(2-methyl-6-oxapentalene)(2-methyl-4-(4'-isopropylphenylindenyl)zirconium dichloride
dimethylsilanediyl(2,5-dimethyl-4-oxapentalene)(2-methyl-4-(4'-isopropylphenylindenyl)zirconium dichloride
dimethylsilanediyl(2,5-dimethyl-6-oxapentalene)(2-methyl-4-(4'-isopropylphenylindenyl)zirconium dichloride
dimethylsilanediyl(2-methyl-4-azapentalene)(2-methyl-4-(4'-n-butylphenylindenyl)zirconium dichloride
dimethylsilanediyl(2-methyl-5-azapentalene)(2-methyl-4-(4'-n-butylphenylindenyl)zirconium dichloride
dimethylsilanediyl(2-methyl-6-azapentalene)(2-methyl-4-(4'-n-butylphenylindenyl)zirconium dichloride
dimethylsilanediyl(2-methyl-N-phenyl-4-azapentatene)(2-methyl-4-(4'-n-butylphenylindenyl)zirconium dichloride
dimethylsilanediyl(2-methyl-N-phenyl-5-azapentalene)(2-methyl-4-(4'-n-butylphenylindenyl)zirconium dichloride
dimethylsilanediyl(2-methyl-N-phenyl-6-azapentalene)(2-methyl-4-(4'-n-butylphenylindenyl)zirconium dichloride
dimethylsilanediyl(2,5-dimethyl-4-azapentalene)(2-methyl-4-(4'-n-butylphenylindenyl)zirconium dichloride
dimethylsilanediyl(2,5-dimethyl-6-azapentalene)(2-methyl-4-(4'-n-butylphenylindenyl)zirconium dichloride
dimethylsilanediyl(2,5-dimethyl-N-phenyl-4-azapentalene)(2-methyl-4-(4'-n-butylphenylindenyl)zirconium dichloride
dimethylsilanediyl(2,5-dimethyl-N-phenyl-6-azapentalene)(2-methyl-4-(4'-n-butylphenylindenyl)zirconium dichloride
dimethylsilanediyl(2-methyl-4-thiapentalene)(2-methyl-4-(4'-n-butylphenylindenyl)zirconium dichloride
dimethylsilanediyl(2-methyl-5-thiapentalene)(2-methyl-4-(4'-n-butylphenylindenyl)zirconium dichloride
dimethylsilanediyl(2-methyl-6-thiapentalene)(2-methyl-4-(4'-n-butylphenylindenyl)zirconium dichloride
dimethylsilanediyl(2,5-dimethyl-4-thiapentalene)(2-methyl-4-(4'-n-butylphenylindenyl)zirconium dichloride
dimethylsilanediyl(2,5-dimethyl-6-thiapentalene)(2-methyl-4-(4'-n-butylphenylindenyl)zirconium dichloride
dimethylsilanediyl(2-methyl-4-oxapentalene)(2-methyl-4-(4'-n-butylphenylindenyl)zirconium dichloride
dimethylsilanediyl(2-methyl-5-oxapentalene)(2-methyl-4-(4'-n-butylphenylindenyl)zirconium dichloride
dimethylsilanediyl(2-methyl-6-oxapentalene)(2-methyl-4-(4'-n-butylpheny(indenyl)zirconium dichloride
dimethylsilanediyl(2,5-dimethyl-4-oxapentalene)(2-methyl-4-(4'-n-butylphenylindenyl)zirconium dichloride
dimethylsilanediyl(2,5-dimethyl-6-oxapentalene)(2-methyl-4-(4'-n-butylphenylindenyl)zirconium dichloride
dimethylsilanediyl(2-methyl-4-azapentalene)(2-methyl-4-(4'-s-butylphenylindenyl)zirconium dichloride
dimethylsilanediyl(2-methyl-5-azapentalene)(2-methyl-4-(4'-s-butylphenylindenyl)zirconium dichloride
dimethylsilanediyl(2-methyl-6-azapentalene)(2-methyl-4-(4'-s-butylphenylindenyl)zirconium dichloride
dimethylsilanediyl(2-methyl-N-phenyl-4-azapentalene)(2-methyl-4-(4'-s-butylphenylindenyl)zirconium dichloride
dimethylsilanediyl(2-methyl-N-phenyl-5-azapentalene)(2-methyl-4-(4'-s-butylphenylindenyl)zirconium dichloride
dimethylsilanediyl(2-methyl-N-phenyl-6-azapentatene)(2-methyl-4-(4'-s-butylphenylindenyl)zirconium dichloride
dimethylsilanediyl(2,5-dimethyl-4-azapentalene)(2-methyl-4-(4'-s-butylphenylindenyl)zirconium dichloride
dimethylsilanediyl(2,5-dimethyl-6-azapentalene)(2-methyl-4-(4'-s-butylphenylindenyl)zirconium dichloride
dimethylsilanediyl(2,5-dimethyl-N-phenyl-4-azapentalene)(2-methyl-4-(4'-s-butylphenylindenyl)zirconium dichloride
dimethylsilanediyl(2,5-dimethyl-N-phenyl-6-azapentalene)(2-methyl-4-(4'-s-butylphenylindenyl)zirconium dichloride
dimethylsilanediyl(2-methyl-4-thiapentalene)(2-methyl-4-(4'-s-butylphenylindenyl)zirconium dichloride
dimethylsilanediyl(2-methyl-5-thiapentalene)(2-methyl-4-(4'-s-butylphenylindenyl)zirconium dichloride dimethylsilanediyl(2-methyl-6-thiapentalene)(2-methyl-4-(4'-s-butylphenylindenyl)zirconium dichloride
dimethylsilanediyl(2,5-dimethyl-4-thiapentalene)(2-methyl-4-(4'-s-butylphenylindenyl)zirconium dichloride
dimethylsilanediyl(2,5-dimethyl-6-thiapentalene)(2-methyl-4-(4'-s-butylphenylindenyl)zirconium dichloride
dimethylsilanediyl(2-methyl-4-oxapentalene)(2-methyl-4-(4'-s-butylphenylindenyl)zirconium dichloride
dimethylsilanediyl(2-methyl-5-oxapentalene)(2-methyl-4-(4'-s-butylphenylindenyl)zirconium dichloride
dimethylsilanediyl(2-methyl-6-oxapentalene)(2-methyl-4-(4'-s-butylphenylindenyl)zirconium dichloride
dimethylsilanediyl(2,5-dimethyl-4-oxapentalene)(2-methyl-4-(4'-s-butylphenylindenyl)zirconium dichloride
dimethylsilanediyl(2,5-dimethyl-6-oxapentalene)(2-methyl-4-(4'-s-butylphenylindenyl)zirconium dichloride
dimethylsilanediyl(2-methyl-4-azapentalene)(2-methyl-4-(4'-tert-butylphenylindenyl)zirconium dichloride
dimethylsilanediyl(2-methyl-5-azapentalene)(2-methyl-4-(4'-tert-butylphenylindenyl)zirconium dichloride
dimethylsilanediyl(2-methyl-6-azapentalene)(2-methyl-4-(4'-tert-butylphenylindenyl)zirconium dichloride
dimethylsilanediyl(2-methyl-N-phenyl-4-azapentalene)(2-methyl-4-(4'-tert-butylphenylindenyl)zirconium dichloride
dimethylsilanediyl(2-methyl-N-phenyl-5-azapentalene)(2-methyl-4-(4'-tert-butylphenylindenyl)zirconium dichloride
dimethylsilanediyl(2-methyl-N-phenyl-6-azapentalene)(2-methyl-4-(4'-tert-butylphenylindenyl)zirconium dichloride
dimethylsilanediyl(2,5-dimethyl-4-azapentalene)(2-methyl-4-(4'-tert-butylphenylindenyl)zirconium dichloride
dimethylsilanediyl(2,5-dimethyl-6-azapentalene)(2-methyl-4-(4'-tert-butylphenylindenyl)zirconium dichloride
dimethylsilanediyl(2,5-dimethyl-N-phenyl-4-azapentalene)(2-methyl-4-(4'-tert-butylphenylindenyl)zirconium dichloride
dimethylsilanediyl(2,5-dimethyl-N-phenyl-6-azapentalene)(2-methyl-4-(4'-tert-butylphenylindenyl)zirconium dichloride
dimethylsilanediyl(2-methyl-4-thiapentalene)(2-methyl-4-(4'-tert-butylphenylindenyl)zirconium dichloride
dimethylsilanediyl(2-methyl-5-thiapentalene)(2-methyl-4-(4'-tert-butylphenylindenyl)zirconium dichloride
dimethylsilanediyl(2-methyl-6-thiapentalene)(2-methyl-4-(4'-tert-butylphenylindenyl)zirconium dichloride
dimethylsilanediyl(2,5-dimethyl-4-thiapentalene)(2-methyl-4-(4'-tert-butylphenylindenyl)zirconium dichloride
dimethylsilanediyl(2,5-dimethyl-6-thiapentalene)(2-methyl-4-(4'-tert-butylphenylindenyl)zirconium dichloride
dimethylsilanediyl(2-methyl-4-oxapentalene)(2-methyl4-(4'-tert-butylphenylindenyl)zirconium dichloride
dimethylsilanediyl(2-methyl-5-oxapentalene)(2-methyl-4-(4'-tert-butylphenylindenyl)zirconium dichloride
dimethylsilanediyl(2-methyl-6-oxapentalene)(2-methyl-4-(4'-tert-butylphenylindenyl)zirconium dichloride
dimethylsilanediyl(2,5-dimethyl-4-oxapentalene)(2-methyl-4-(4'-tert-butylphenylindenyl)zirconium dichloride
dimethylsilanediyl(2,5-dimethyl-6-oxapentalene)(2-methyl-4-(4'-tert-butylphenylindenyl)zirconium dichloride
dimethylsilanediyl(2-methyl-4-azapentalene)(2-methyl-4-(4'-n-pentylphenylindenyl)zirconium dichloride
dimethylsilanediyl(2-methyl-5-azapentalene)(2-methyl-4-(4'-n-pentylphenylindenyl)zirconium dichloride
dimethylsilanediyl(2-methyl-6-azapentalene)(2-methyl-4-(4'-n-pentylphenylindenyl)zirconium dichloride
dimethylsilanediyl(2-methyl-N-phenyl-4-azapentalene)(2-methyl-4-(4'-n-pentylphenylindenyl)zirconium dichloride
dimethylsilanediyl(2-methyl-N-phenyl-5-azapentalene)(2-methy4-(4'-n-pentylphenylindenyl)zirconium dichloride
dimethylsilanediyl(2-methyl-N-phenyl-6-azapentalene)(2-methyl-4-(4'-n-pentylphenylindenyl)zirconium dichloride
dimethylsilanediyl(2,5-dimethyl-4-azapentalene)(2-methyl-4-(4'-n-pentylphenylindenyl)zirconium dichloride
dimethylsilanediyl(2,5-dimethyl-6-azapentalene)(2-methyl-4-(4'-n-pentylphenylindenyl)zirconium dichloride
dimethylsilanediyl(2,5-dimethyl-N-phenyl-4-azapentalene)(2-methyl-4-(4'-n-pentylphenylindenyl)zirconium dichloride
dimethylsilanediyl(2,5-dimethyl-N-phenyl-6-azapentalene)(2-methyl-4-(4'-n-pentylphenylindenyl)zirconium dichloride
dimethylsilanediyl(2-methyl-4-thiapentalene)(2-methyl-4-(4'-n-pentylphenylindenyl)zirconium dichloride
dimethylsilanediyl(2-methyl-5-thiapentalene)(2-methyl-4-(4'-n-pentylphenylindenyl)zirconium dichloride
dimethylsilanediyl(2-methyl-6-thiapentalene)(2-methyl-4-(4'-n-pentylphenylindenyl)zirconium dichloride
dimethylsilanediyl(2,5-dimethyl-4-thiapentalene)(2-methyl-4-(4'-n-pentylphenylindenyl)zirconium dichloride
dimethylsilanediyl(2,5-dimethyl-6-thiapentalene)(2-methyl-4-(4'-n-pentylphenylindenyl)zirconium dichloride
dimethylsilanediyl(2-methyl-4-oxapentalene)(2-methyl-4-(4'-n-pentylphenylindenyl)zirconium dichloride
dimethylsilanediyl(2-methyl-5-oxapentalene)(2-methyl-4-(4'-n-pentylphenylindenyl)zirconium dichloride
dimethylsilanediyl(2-methyl-6-oxapentalene)(2-methyl-4-(4'-n-pentylphenylindenyl)zirconium dichloride
dimethylsilanediyl(2,5-dimethyl-4-oxapentalene)(2-methyl-4-(4'-n-pentylphenylindenyl)zirconium dichloride
dimethylsilanediyl(2,5-dimethyl-oxapentalene)(2-methyl-4-(4'-n-pentylphenylindenyl)zirconium dichloride
dimethylsilanediyl(2-methyl-4-azapentalene)(2-methyl-4-(4'-n-hexylphenylindenyl)zirconium dichloride
dimethylsilanediyl(2-methyl-5-azapentalene)(2-methyl-4-(4'-n-hexylphenylindenyl)zirconium dichloride dimethylsilanediyl(2-methyl-6-azapentalene)(2-methyl-4-(4'-n-hexylphenylindenyl)zirconium dichloride dimethylsilanediyl(2-methyl-N-phenyl-4-azapentalene)(2-methyl-4-(4'-n-hexylphenylindenyl)zirconium dichloride dimethylsilanediyl(2-methyl-N-phenyl-5-azapentalene)(2-methyl-4-(4'-n-hexylphenylindenyl)zirconium dichloride dimethylsilanediyl(2-methyl-N-phenyl-6-azapentalene)(2-methyl-4-(4'-n-hexylphenylindenyl)zirconium dichloride dimethylsilanediyl(2,5-dimethyl-4-azapentalene)(2-methyl-4-(4'-n-hexylphenylindenyl)zirconium dichloride dimethylsilanediyl(2,5-dimethyl-6-azapentalene)(2-methyl-4-(4'-n-hexylphenylindenyl)zirconium dichloride dimethylsilanediyl(2,5-dimethyl-N-phenyl-4-azapentalene)(2-methyl-4-(4'-n-hexylphenylindenyl)zirconium dichloride dimethylsilanediyl(2,5-dimethyl-N-phenyl-6-azapentalene)(2-methyl-4-(4'-n-hexylphenylindenyl)zirconium dichloride dimethylsilanediyl(2-methyl-4-thiapentalene)(2-methyl-4-(4'-n-hexylphenylindenyl)zirconium dichloride dimethylsilanediyl(2-methyl-5-thiapentalene)(2-methyl-4-(4'-n-hexylphenylindenyl)zirconium dichloride dimethylsilanediyl(2-methyl-6-thiapentalene)(2-methyl-4-(4'-n-hexylphenylindenyl)zirconium dichloride dimethylsilanediyl(2,5-dimethyl-4-thiapentalene)(2-methyl-4-(4'-n-hexylphenylindenyl)zirconium dichloride dimethylsilanediyl(2,5-dimethyl-6-thiapentalene)(2-methyl-4-(4'-n-hexylphenylindenyl)zirconium dichloride dimethylsilanediyl(2-methyl-4-oxapentalene)(2-methyl-4-(4'-n-hexylphenylindenyl)zirconium dichloride dimethylsilanediyl(2-methyl-5-oxapentalene)(2-methyl-4-(4'-n-hexylphenylindenyl)zirconium dichloride dimethylsilanediyl(2-methyl-6-oxapentalene)(2-methyl-4-(4'-n-hexylphenylindenyl)zirconium dichloride dimethylsilanediyl(2,5-dimethyl-4-oxapentalene)(2-methyl-4-(4'-n-hexylphenylindenyl)zirconium dichloride dimethylsilanediyl(2,5-dimethyl-6-oxapentalene)(2-methyl-4-(4'-n-hexylphenylindenyl)zirconium dichloride dimethylsilanediyl(2-methyl-4-azapentalene)(2-methyl-4-(4'-cyclohexylphenylindenyl)zirconium dichloride dimethylsilanediyl(2-methyl-5-azapentalene)(2-methyi4-(4'-cyclohexylphenylindenyl)zirconium dichloride dimethylsilanediyl(2-methyl-6-azapentalene)(2-methyl-4-(4'-cyclohexylphenylindenyl)zirconium dichloride dimethylsilanediyl(2-methyl-N-phenyl-4-azapentalene)(2-methyl-4-(4'-cyclohexylphenylindenyl)zirconium dichloride dimethylsilanediyl(2-methyl-N-phenyl-5-azapentalene)(2-methyl-4-(4'-cyclohexylphenylindenyl)zirconium dichloride dimethylsilanediyl(2-methyl-N-phenyl-6-azapentalene)(2-methyl-4-(4'-cyclohexylphenylindenyl)zirconium dichloride dimethylsilanediyl(2,5-dimethyl-4-azapentalene)(2-methyl-4-(4'-cyclohexylphenylindenyl)zirconium dichloride dimethylsilanediyl(2,5dimethyl-6-azapentalene)(2-methyl-4-(4'-cyclohexylphenylindenyl)zirconium dichloride dimethylsilanediyl(2,5-dimethyl-N-phenyl-4-azapentalene)(2-methyl-4-(4'-cyclohexylphenylindenyl)zirconium dichloride dimethylsilanediyl(2,5-dimethyl-N-phenyl-6-azapentalene)(2-methyl-4-(4'-cyclohexylphenylindenyl)zirconium dichloride dimethylsilanediyl(2-methyl-4-thiapentalene)(2-methyl-4-(4'-cyclohexylphenylindenyl)zirconium dichloride dimethylsilanediyl(2-methyl-5-thiapentalene)(2-methyl-4-(4'-cyclohexylphenylindenyl)zirconium dichloride dimethylsilanediyl(2-methyl-6-thiapentalene)(2-methyl-4-(4'-cyclohexylphenylindenyl)zirconium dichloride dimethylsilanediyl(2,5-dimethyl-4-thiapentalene)(2-methyl-4-(4'-cyclohexylphenylindenyl)zirconium dichloride dimethylsilanediyl(2,5-dimethyl-6-thiapentalene)(2-methyl-4-(4'-cyclohexylphenylindenyl)zirconium dichloride dimethylsilanediyl(2-methyl-4-oxapentalene)(2-methyl-4-(4'-cyclohexylphenylindenyl)zirconium dichloride dimethylsilanediyl(2-methyl-5-oxapentalene)(2-methyl-4-(4'-cyclohexylphenylindenyl)zirconium dichloride dimethylsilanediyl(2-methyl-6-oxapentalene)(2-methyl-4-(4'-cyclohexylphenylindenyl)zirconium dichloride dimethylsilanediyl(2,5-dimethyl-4-oxapentalene)(2-methyl-4-(4'-cyclohexylphenylindenyl)zirconium dichloride dimethylsilanediyl(2,5-dimethyl-6-oxapentalene)(2-methyl-4-(4'-cyclohexylphenylindenyl)zirconium dichloride dimethylsilanediyl(2-methyl-4-azapentalene)(2-methyl-4-(4'-trimethylsilylphenylindenyl)zirconium dichloride dimethylsilanediyl(2-methyl-5-azapentalene)(2-methyl-4-(4'-trimethylsilylphenylindenyl)zirconium dichloride dimethylsilanediyl(2-methyl-6-azapentalene)(2-methyl-4-(4'-trimethysilylphenylindenyl)zirconium dichloride dimethylsilanediyl(2-methyl-N-phenyl-4-azapentalene)(2-methyl-4-(4'-trimethylsilylphenylindenyl)zirconium dichloride dimethylsilanediyl(2-methyl-N-phenyl-5-azapentalene)(2-methyl-4-(4'-trimethylsilylphenylindenyl)zirconium dichloride dimethylsilanediyl(2-methyl-N-phenyl-6-azapentalene)(2-methyl-4-(4'-trimethylsilylphenylindenyl)zirconium dichloride dimethylsilanediyl(2,5-dimethyl-4-azapentalene)(2-methyl-4-(4'-trimethylsilylphenylindenyl)zirconium dichloride dimethylsilanediyl(2,5-dimethyl-6-azapentalene)(2-methyl-4-(4'-trimethylsilylphenylindenyl)zirconium dichloride dimethylsilanediyl(2,5-dimethyl-N-phenyl-4-azapentalene)(2-methyl-4-(4'-trimethylsilylphenylindenyl)zirconium dichloride dimethylsilanediyl(2,5-dimethyl-N-phenyl-6-azapentalene)(2-methyl-4-(4'-trimethylsilylphenylindenyl)zirconium dichloride dimethylsilanediyl(2-methyl-4-thiapentalene)(2-methyl-4-(4'-trimethylsilylphenylindenyl)zirconium dichloride dimethylsilanediyl(2-methyl-5-thiapentalene)(2-methyl-4-(4'-trimethylsilylphenylindenyl)zirconium dichloride dimethylsilanediyl(2-methyl-6-thiapentalene)(2-methyl-4-(4'-trimethylsilylphenylindenyl)zirconium dichloride dimethylsilanediyl(2,5-dimethyl-4,4hiapentalene)(2-methyl-4-(4'-trimethylsilylphenylindenyl)zirconium dichloride dimethylsilanediyl(2,5-dimethyl-6-thiapentalene)(2-methyl-4-(4'-trimethylsilylphenylindenyl)zirconium dichloride dimethylsilanediyl(2-methyl-4-oxapentalene)(2-methyl-4-(4'-trimethylsilylphenylindenyl)zirconium dichloride dimethylsilanediyl(2-methyl-5-oxapentalene)(2-methyl-4-(4'-trimethylsilylphenylindenyl)zirconium dichloride dimethylsilanediyl(2-methyl-6-oxapentalene)(2-methyl-4-(4'-trimethylsilylphenylindenyl)zirconium dichloride dimethylsilanediyl(2,5-dimethyl-4-oxapentalene)(2-methyl 4-(4'-trimethylsilylphenylindenyl)zirconium dichloride dimethylsilanediyl(2,5-dimethyl-6-oxapentalene)(2-methyl-4-(4'-trimethylsilylphenylindenyl)zirconium dichloride dimethylsilanediyl(2-methyl-4-azapentalene)(2-methyl-4-(4'-adamantylphenylindenyl)zirconium dichloride dimethylsilanediyl(2-methyl-5-azapentalene)(2-methyl-4-(4'-adamantylphenylindenyl)zirconium dichloride dimethylsilanediyl(2-methyl-6-azapentalene)(2-methyl-4-(4'-adamantylphenylindenyl)zirconium dichloride dimethylsilanediyl(2-methyl-N-phenyl-4-azapentalene)(2-methyl-4-(4'-adamantylphenylindenyl)zirconium dichloride dimethylsilanediyl(2-methyl-N-phenyl-5-azapentalene)(2-methyl-4-(4'-adamantylphenylindenyl)zirconium dichloride dimethylsilanediyl(2-methyl-N-phenyl-6-azapentalene)(2-methyl-4-(4'-adamantylphenylindenyl)zirconium dichloride dimethylsilanediyl(2,5-dimethyl-4-azapentalene)(2-methyl-4-(4'-adamantylphenylindenyl)zirconium dichloride dimethylsilanediyl(2,5-dimethyl-6-azapentalene)(2-methyl-4-(4'-adamantylphenylindenyl)zirconium dichloride dimethylsilanediyl(2,5-dimethyl-4-azapentalene)(2-methyl-4-(4'-adamantylphenylindenyl)zirconium dichloride dimethylsilanediyl(2,5-dimethyl-N-phenyl-4-azapentalene)(2-methyl-4-(4'-adamantylphenylindenyl)zirconium dichloride dimethylsilanediyl(2,5-dimethyl-N-phenyl-6-azapentalene)(2-methyl-4-(4'-adamantylphenylindenyl)zirconium dichloride dimethylsilanediyl(2-methyl-4-thiapentalene)(2-methyl-4-(4'-adamantylphenylindenyl)zirconium dichloride dimethylsilanediyl(2-methyl-5-thiapentalene)(2-methyl-4-(4'-adamantylphenylindenyl)zirconium dichloride dimethylsilanediyl(2-methyl-6-thiapentalene)(2-methyl-4-(4'-adamantylphenylindenyl)zirconium dichloride dimethylsilanediyl(2,5-dimethyl-4-thiapentalene)(2-methyl-4-(4'-adamantylphenylindenyl)zirconium dichloride dimethylsilanediyl(2,5-dimethyl-6-thiapentalene)(2-methyl-4-(4'-adamantylphenylindenyl)zirconium dichloride dimethylsilanediyl(2-methyl-4-oxapentalene)(2-methyl-4-(4'-adamantylphenylindenyl)zirconium dichloride dimethylsilanediyl(2-methyl-5-oxapentalene)(2-methyl-4-(4'-adamantylphenylindenyl)zirconium dichloride dimethylsilanediyl(2-methyl-6-oxapentalene)(2-methyl-4-(4'-adamantylphenylindenyl)zirconium dichloride dimethylsilanediyl(2,5-dimethyl-4-oxapentalene)(2-methyl-4-(4'-adamantylphenylindenyl)zirconium dichloride dimethylsilanediyl(2,5-dimethyl-6-oxapentalene)(2-methyl-4-(4'-adamantylphenylindenyl)zirconium dichloride dimethylsilanediyl(2-methyl-4-azapentalene)(2-methyl-4-(4'-tris(trifluoromethyl)methylphenylindenyl)zirconium dichloride dimethylsilanediyl(2-methyl-5-azapentalene)(2-methyl-4-(4'-tris(trifluoromethyl)methylphenylindenyl)zirconium dichloride dimethylsilanediyl(2-methyl-6-azapentalene)(2-methyl-4-(4'-tris(trifluoromethyl)methylphenylindenyl)zirconium dichloride dimethylsilanediyl(2-methyl-N-phenyl-4-azapentalene)(2-methyl-4-(4'-tris(trifluoromethyl)methylphenylindenyl)zirconium dichloride dimethylsilanediyl(2-methyl-N-phenyl-5-azapentalene)(2-methyl-4-(4'-tris(trifluoromethyl)methylphenylindenyl)zirconium dichloride dimethylsilanediyl(2-methyl-N-phenyl-6-azapentalene)(2-methyl-4-(4'-tris(trifluoromethyl)methylphenylindenyl)zirconium dichloride dimethylsilanediyl(2,5-dimethyl-4-azapentalene)(2-methyl-4-(4'-tris(trifluoromethyl)methylphenylindenyl)zirconium dichloride dimethylsilanediyl(2,5-dimethyl-6-azapentalene)(2-methyl-4-(4'-tris(trifluoromethyl)methylphenylindenyl)zirconium dichloride dimethylsilanediyl(2,5-dimethyl-N-phenyl-4-azapentalene)(2-methyl-4-(4'-tris(trifluoromethyl)methylphenylindenyl)zirconium dichloride dimethylsilanediyl(2,5-dimethyl-N-phenyl-6-azapentalene)(2-methyl-4-(4'-tris(trifluoromethyl)methylphenylindenyl)zirconium dichloride dimethylsilanediyl(2-methyl-4-thiapentalene)(2-methyl-4-(4'-tris(trifluoromethyl)methylphenylindenyl)zirconium dichloride dimethylsilanediyl(2-methyl-5-thiapentalene)(2-methyl-4-(4'-tris(trifluoromethyl)methylphenylindenyl)zirconium dichloride dimethylsilanediyl(2-methyl-6-thiapentalene)(2-methyl-4-(4'-tris(trifluoromethyl)methylphenylindenyl)zirconium dichloride dimethylsilanediyl(2,5-dimethyl-4-thiapentalene)(2-methyl-4-(4'-tris(trifluoromethyl)methylphenylindenyl)zirconium dichloride dimethylsilanediyl(2,5-dimethyl-6-thiapentalene)(2-methyl-4-(4'-tris(trifluoromethyl)methylphenylindenyl)zirconium dichloride dimethylsilanediyl(2-methyl-4-oxapentalene)(2-methyl-4-(4'-tris(trifluoromethyl)methylphenylindenyl)zirconium dichloride dimethylsilanediyl(2-methyl-5-oxapentalene)(2-methyl-4-(4'-tris(trifluoromethyl)methylphenylindenyl)zirconium dichloride dimethylsilanediyl(2-methyl-6-oxapentalene)(2-methyl-4-(4'-tris(trifluoromethyl)methylphenylindenyl)zirconium dichloride dimethylsilanediyl(2,5-dimethyl-4-oxapentalene)(2-methyl-4-(4'-tris(trifluoromethyl)methylphenylindenyl)zirconium dichloride
dimethylsilanediyl(2,5-dimethyl-6-oxapentalene)(2-methyl-4-(4'-tris(trifluoromethyl)methylphenylindenyl)zirconium dichloride
dimethylsilanediyl(2-methyl-4-azapentalene)(2-ethyl-4-(4'-tert-butylphenylindenyl)zirconium dichloride
dimethylsilanediyl(2-methyl-5,6-dihydr-4-azapentalene)(2-ethyl-4-(4'-tert-butylphenylindenyl)zirconium dichloride
dimethylsilanediyl(2-methyl-4-azapentalene)(2-ethyl-4-(4'-tert-butylphenyltetrahydroindenyl)zirconium dichloride
dimethylsilanediyl(2-methyl-5-azapentalene)(2-n-butyl-4-(4'-tert-butylphenylindenyl)zirconium dichloride
ethylidene(2-methyl-6-azapentalene)(2-methyl-4-(4'-tert-butylphenylindenyl)zirconium dichloride
dimethylsilanediyl(2-methyl-N-trimethylsilyl4-azapentalene)(2-methyl-4-(4'-tert-butylphenylindenyl)zirconium dichloride
dimethylsilanediyl(2-methyl-N-tolyl-5-azapentalene)(2-n-propyl-4-(4'-tert-butylphenylindenyl)zirconium dichloride
dimethylgermyldiyl(2-methyl-N-phenyl-6-azapentalene)(2-methyl-4-(4'-tert-butylphenylindenyl)zirconium dichloride
methylethylidene(2,5-dimethyl-4-azapentalene)(2-methyl-4-(4'-tert-butylphenylindenyl)zirconium dichloride
dimethylsilanediyl(2,5-diisopropyl-6-azapentalene)(2-methyl-4-(4'-tert-butylphenylindenyl)zirconium dichloride
dimethylsilanediyl(2,5-dimethyl-N-phenyl-4-azapentalene)(2,6-dimethyl-4-(4'-tertbutylphenylindenyl)zirconium dichloride
dimethylsilanediyl(2,5-dimethyl-N-phenyl-6-azapentalene)(2-methyl-4-(6'-tert-butylnaphthylindenyl)zirconium dichloride
dimethylsilanediyl(2,5-dimethyl-N-phenyl-6-azapentalene)(2-methyl-4-(6'-tert-butylanthracenylindenyl)zirconium dichloride
dimethylsilanediyl(2-methyl-4-phosphapentalene)(2-methyl-4-(4'-tert-butylphenylindenyl)zirconium dichloride
diphenylsilanediyl(2-methyl-5-thiapentalene)(2-methyl-4-(4'-tert-butylphenylindenyl)zirconium dichloride
methylphenylsilanediyl(2-methyl-6-thiapentalene)(2-methyl-4-(4'-tert-butylphenylindenyl)zirconium dichloride
methylidene(2,5-dimethyl-4-thiapentalene)(2-methyl-4-(4'-tert-butylphenylindenyl)zirconium dichloride
dimethylmethylidene(2,5-dimethyl-6-thiapentalene)(2-methyl-4-(4'-tert-butylphenylindenyl)zirconium dichloride
diphenylsilanediyl(2,5-dimethyl-4-oxapentalene)(2-methyl-4-(4'-tert-butylphenylindenyl)zirconium dichloride
diphenylsilanediyl(2,5-dimethyl-6-oxapentalene)(2-methyl-4-(4'-tert-butylphenylindenyl)zirconium dichloride
dimethylsilanediyl(2-methyl-4-azapentalene)(2-methylindenyl)zirconium dichloride
dimethylsilanediyl(2-methyl-5-azapentalene)(2-methylindenyl)zirconium dichloride
dimethylsilanediyl(2-methyl-6-azapentalene)(2-methylindenyl)zirconium dichloride
dimethylsilanediyl(2-methyl-N-phenyl-4-azapentalene)(2-methylindenyl)zirconium dichloride
dimethylsilanediyl(2-methyl-N-phenyl-5-azapentalene)(2-methylindenyl)zirconium dichloride
dimethylsilanediyl(2-methyl-N-phenyl-6-azapentalene)(2-methylindenyl)zirconium dichloride
dimethylsilanediyl(2,5-dimethyl-4-azapentalene)(2-methylindenyl)zirconium dichloride
dimethylsilanediyl(2,5-dimethyl-6-azapentalene)(2-methylindenyl)zirconium dichloride
dimethylsilanediyl(2,5-dimethyl-N-phenyl-4-azapentalene)(2-methylindenyl)zirconium dichloride
dimethylsilanediyl(2,5-dimethyl-N-phenyl-6-azapentalene)(2-methylindenyl)zirconium dichloride
dimethylsilanediyl(2-methyl-4-thiapentalene)(2-methylindenyl)zirconium dichloride
dimethylsilanediyl(2-methyl-5thiapentalene)(2-methylindenyl)zirconium dichloride
dimethylsilanediyl(2-methyl-6-thiapentalene)(2-methylindenyl)zirconium dichloride
dimethylsilanediyl(2,5-dimethyl-4-thiapentalene)(2-methylindenyl)zirconium dichloride
dimethylsilanediyl(2,5-dimethyl-6-thiapentalene)(2-methylindenyl)zirconium dichloride
dimethylsilanediyl(2-methyl-4-oxapentalene)(2-methylindenyl)zirconium dichloride
dimethylsilanediyl(2-methyl-5-oxapentalene)(2-methylindenyl)zirconium dichloride
dimethylsilanediyl(2-methyl-6-oxapentalene)(2-methylindenyl)zirconium dichloride
dimethylsilanediyl(2,5-dimethyl-4-oxapentalene)(2-methylindenyl)zirconium dichloride
dimethylsilanediyl(2,5-dimethyl-6-oxapentalene)(2-methylindenyl)zirconium dichloride
dimethylsilanediyl(2-methyl-4-azapentalene)(indenyl)zirconium dichloride
dimethylsilanediyl(2-methyl-5-azapentalene)(indenyl)zirconium dichloride
dimethylsilanediyl(2-methyl-6-azapentalene)(indenyl)zirconium dichloride
dimethylsilanediyl(2-methyl-N-phenyl-4-azapentalene)(indenyl)zirconium dichloride
dimethylsilanediyl(2-methyl-N-phenyl-5-azapentalene)(indenyl)zirconium dichloride
dimethylsilanediyl(2-methyl-N-phenyl-6-azapentalene)(indenyl)zirconium dichloride
dimethylsilanediyl(2,5-dimethyl-4-azapentalene)(indenyl)zirconium dichloride
dimethylsilanediyl(2,5-dimethyl-6-azapentalene)(indenyl)zirconium dichloride
dimethylsilanediyl(2,5-dimethyl-N-phenyl-4-azapentalene)(indenyl)zirconium dichloride
dimethylsilanediyl(2,5-dimethyl-N-phenyl-6-azapentalene)(indenyl)zirconium dichloride
dimethylsilanediyl(2-methyl-4-thiapentalene)(indenyl)zirconium dichloride
dimethylsilanediyl(2-methyl-5-thiapentalene)(indenyl)zirconium dichloride dimethylsilanediyl(2-methyl-6-thiapentalene)(indenyl)
zirconium dichloride
dimethylsilanediyl(2,5-dimethyl-4-thiapentalene)
(indenyl)zirconium dichloride
dimethylsilanediyl(2,5-dimethyl-6-thiapentalene)
(indenyl)zirconium dichioride
dimethylsilanediyl(2-methyl-4-oxapentalene)(indenyl)
zirconium dichloride
dimethylsilanediyl(2-methyl-5-oxapentalene)(indenyl)
zirconium dichloride
dimethylsilanediyl(2-methyl-6-oxapentalene)(indenyl)
zirconium dichloride
dimethylsilanediyl(2,5-dimethyl-4-oxapentalene)
(indenyl)zirconium dichloride
dimethylsilanediyl(2,5-dimethyl-6-oxapentalene)
(indenyl)zirconium dichloride
dimethylsilanediyl(2-methyl-4-azapentalene)
(2methyl4peyindenyl)zirconium dichloride
dimethylsilanediyl(2-methyl-5-azapentalene)
(2methyl4peyindenyl)zirconium dichloride
dimethylsilanediyl(2-methyl-5-azapentalene)
(2methyl4peyindenyl)zirconium dichloride
dimethylsilanediyl(2-methyl-N-phenyl-4-azapentalene)
(2-methyl-4phenylindenyl)zirconium dichloride
dimethylsilanediyl(2-methyl-N-phenyl-5-azapentalene)
(2-methyl-4-phenylindenyl)zirconium dichioride
dimethylsilanediyl(2-methyl-N-phenyl-6-azapentalene)
(2-methyl-4-phenylindenyl)zirconium dichioride
dimethylsilanediyl(2,5-dimethyl-6-azapentalene)(2-
methyl-4-phenylindenyl)zirconium dichloride
dimethylsilanediyl(2,5-dimethyl-6-azapentalene)(2-
methyl-4-phenylindenyl)zirconium dichloride
dimethylsilanediyl(2,5-dimethyl-N-phenyl-4-
azapentalene)(2-methyl-4-phenylindenyl)zirconium
dichloride
dimethylsilanediyl(2,5-dimethyl-N-phenyl-6-
azapentalene)(2-methyl-4-phenylindenyl)zirconium
dichloride
dimethylsilanediyl(2-methyl-4-thiapentalene)(2-methyl-
4-phenylindenyl)zirconium dichloride
dimethylsilanediyl(2-methyl-5-thiapentalene)(2-methyl-
4-phenylindenyl)zirconium dichloride
dimethylsilanediyl(2-methyl-6-thiapentalene)(2-methyl-
4-phenylindenyl)zirconium dichloride
dimethylsilanediyl(2,5-dimethyl-4-thiapentalene)(2-
methyl-4-phenylindenyl)zirconium dichloride
dimethylsilanediyl(2,5-dimethyl-6-thiapentalene)(2-
methyl-4-phenylindenyl)zirconium dichloride
dimethylsilanediyl(2-methyl-4-oxapentalene)(2-methyl-
4-phenylindenyl)zirconium dichloride
dimethylsilanediyl(2-methyl-5-oxapentalene)(2-methyl-
4-phenylindenyl)zirconium dichloride
dimethylsilanediyl(2-methyl-6-oxapentalene)(2-methyl-
4-phenylindenyl)zirconium dichloride
dimethylsilanediyl(2,5-dimethyl-4-oxapentalene)(2-
methyl-4-phenylindenyl)zirconium dichloride
dimethylsilanediyl(2,5-dimethyl-6-oxapentalene)(2-
methyl-4-phenylindenyl)zirconium dichloride
dimethylsilanediyl(2-methyl-4-azapentalene)(2-methyl-
4,5-benzindenyl)zirconium dichloride
dimethylsilanediyl(2-methyl-5-azapentalene)(2-methyl-
4,5-benzindenyl)zirconium dichloride
dimethylsilanediyl(2-methyl-6-azapentalene)(2-methyl-
4,5-benzindenyl)zirconium dichloride
dimethylsilanediyl(2-methyl-N-phenyl-4-azapentalene)
(2-methyl-4,5-benzindenyl)zirconium dichloride
dimethylsilanediyl(2-methyl-N-phenyl-5-azapentalene)
(2-methyl-4,5-benzindenyl)zirconium dichloride
dimethylsilanediyl(2-methyl-N-phenyl-6-azapentalene)
(2-methyl-4,5-benzindenyl)zirconium dichloride
dimethylsilanediyl(2,5-dimethyl-4-azapentalene)(2-
methyl-4,5-benzindenyl)zirconium dichloride
dimethylsilanediyl(2,5-dimethyl-6-azapentalene)(2-
methyl-4,5-benzindenyl)zirconium dichloride
dimethylsilanediyl(2,5-dimethyl-N-phenyl-4-
azapentalene)(2-methyl-4,5-benzindenyl)zirconium
dichioride
dimethylsilanediyl(2,5-dimethyl-N-phenyl-6-
azapentalene)(2-methyl-4,5-benzindenyl)zirconium
dichioride
dimethylsilanediyl(2-methyl-4-thiapentalene)(2-methyl-
4,5-benzindenyl)zirconium dichloride
dimethylsilanediyl(2-methyl-5-thiapentalene)(2-methyl-
4,5-benzindenyl)zirconium dichloride
dimethylsilanediyl(2-methyl-6-thiapentalene)(2-methyl-
4,5-benzindenyl)zirconium dichloride
dimethylsilanediyl(2,5-dimethyl-4-thiapentalene)(2-
methyl-4,5-benzindenyl)zirconium dichloride
dimethylsilanediyl(2,5-dimethyl-6-thiapentalene)(2-
methyl-4,5-benzindenyl)zirconium dichloride
dimethylsilanediyl(2-methyl-4-oxapentalene)(2-methyl-
4,5-benzindenyl)zirconium dichloride
dimethyisilanediyl(2-methyl-5-oxapentalene)(2-methyl-
4,5-benzindenyl)zirconium dichloride
dimethylsilanediyl(2,5-dimethyl-4oxapentalene)(2-
methyl-4,5-benzindenyl)zirconium dichloride
dimethylsilanediyl(2,5-dimethyl-6oxapentalene)(2-
methyl-4,5-benzindenyl)zirconium dichloride
dimethylsilanediylbis(2-methyl-4-azapentalene)
zirconium dichloride
dimethylsilanediylbis(2-methyl-5-azapentalene)
zirconium dichloride
dimethylsila ned iylbis(2-methyl-6-azapentalene:)
zirconium dichloride
dimethylsilanediylbis(2-methyl-N-phenyl-4-
azapentalene)zirconium dichloride
dimethylsilanediyibis(2-methyl-N-phenyl-5-
azapentalenie)zirconium dichloride
dimethylsilanediylbis(2-methyl-N-phenyl-6-
azapentalene)zirconium dichloride
dimethylsilanediylbis(2,5-dimethyl-4-azapentalene)
zirconium dichlonde
dimethylsilanediylbis(2,5-dimethyl-6-azapentalehe)
zirconium dichloride
dimethylsilanediylbis(2-methyl-4-thiapentalene)
zirconium dichloride
dimethylsilanediyibis(2-methyl-4thiapentalene)
zirconium dichloride
dimethylsilanediylbis(2-methyl-6-thiapentalene)
zirconium dichloride
dimethylsilanediylbis(2,5-dimethyl-4-thiapentalene)
zirconium dichloride
dimethylsilanediylbis(2,5-dimethyl-6-thiapentalene)
zirconium dichloride dimethylsilanediylbis(2-methyl-4-oxapentalene) zirconium dichloride dimethylsilanediylbis(2-methyl-5-oxapentalene) zirconium dichloride dimethylsilanediylbis(2-methyl-6-oxapentalene) zirconium dichloride dimethylsilanediylbis(2,5-dimethyl-4-oxapentalene) zirconium dichloride dimethylsilanediylbis(2,5-dimethyl-6-oxapentalene) zirconium dichloride The catalyst system of the invention can be obtained by reacting a Lewis base of the formula (I) and an organoboroaluminum compound which is built up of units of the formula (II) with a support. This is followed by reaction with a solution or suspension of one or more metallocene compounds of the formula (VI) and, if desired, one or more organometallic compounds of the formula (V).

The activation of the catalyst system can thereby be carried out either before introduction into the reactor or only after introduction into the reactor. Furthermore, a process for preparing polyolefins is also described. The addition of a further chemical compound which is added as additive before the polymerization can additionally be advantageous.

To prepare the catalyst system of the invention, the support material is suspended in an organic solvent. Suitable solvents are aromatic or aliphatic solvents such as hexane, heptane, toluene or xylene or halogenated hydrocarbons such as methylene chloride or halogenated aromatic hydrocarbons such as o-dichlorobenzene. The support can be pretreated beforehand with a compound of the formula (V). Subsequently, one or more compounds of the formula (I) are added to this suspension; the reaction time can be from 1 minute to 48 hours, preferably from 10 minutes to 2 hours. The reaction solution can be isolated and subsequently resuspended or else can be reacted directly with a cocatalytically active organoboroaluminum compound which is built up of units of the formula (II). The reaction time here is from 1 minute to 48 hours, with a reaction time of from 10 minutes to 2 hours being preferred. Preference is given to reacting from 1 to 4 equivalents of a Lewis base of the formula (I) with one equivalent of a cocatalytically active compound which is built up of units of the formula (II). Particular preference is given to reacting one equivalent of a Lewis base of the formula (I) with one equivalent of a cocatalytically active compound built up of units of the formula (II). The product of this reaction is a compound capable of forming metallocenium ions which is covalently fixed to the support material. It is hereinafter referred to as modified support material. The reaction mixture is subsequently filtered and washed with one of the abovementioned solvents. The modified support material is then dried in a high vacuum. After drying, the modified support material can be resuspended and after-treated with a compound of the formula (V). However, the compound of the formula (V) can also be added prior to filtration and drying of the modified support material. The application of one or more metallocene compounds, preferably of the formula (VI), and one or more organometallic compounds of the formula (V) to the modified support material is preferably carried out by dissolving or suspending one or more metallocene compounds of the formula (VI) in an above-described solvent and subsequently reacting it/them with one or more compounds of the formula (V), which is/are preferably likewise dissolved or suspended. The stoichiometric ratio of metallocene compound of the formula (VI) and organometallic compound of the formula (V) is from 100:1 to $10^{-4}$:1. The ratio is preferably from 1:1 to $10^{-2}$:1.

The modified support material together with one of the abovementioned solvents can either be placed directly in the polymerization reactor or in a reaction flask. The mixture of metallocene compound of the formula (VI) and organometallic compound of the formula (V) is then added. As an alternative, one or more metallocene compounds of the formula (VI) can be added to the modified support material without prior addition of an organometallic compound of the formula (V). The ratio of modified support to metallocene compound of the formula (VI) is preferably from 10 g:1 $\mu$mol to $10^{-2}$ g:1 $\mu$mol. The stoichiometric ratio of metallocene compound of the formula (VI) to the supported, cocatalytically active organoboroaluminum compound comprising units of the formula (II) is from 100:1 to $10^{-4}$:1, preferably from 1:1 to $10^{-2}$:1.

The supported catalyst system can be used directly for the polymerization. However, it is also possible for the solvent to be removed and the catalyst system to be subsequently resuspended and used for the polymerization. The advantage of this activation method is that it offers the option of allowing the polymerization-active catalyst system to be formed only in the reactor. This prevents decomposition from occurring when introducing the air-sensitive catalyst in to the reactor.

Furthermore, a process for preparing an olefin polymer in the presence of the catalyst system of the invention is also described. The polymerization can be a homopolymerization or a copolymerization.

Preference is given to polymerizing olefins of the formula $R^\alpha$—CH=CH—$R^\beta$, where $R^\alpha$ and $R^\beta$ are identical or different and are each a hydrogen atom, a halogen atom, an alkoxy, hydroxy, alkylhydroxy, aldehyde, carboxyl or carboxylic ester group or a saturated or unsaturated hydrocarbon radical having from 1 to 20 carbon atoms, in particular from 1 to 10 carbon atoms, which may be substituted by an alkoxy, hydroxy, alkylhydroxy, aldehyde, carboxyl or carboxylic ester group, or $R^\alpha$ and $R^\beta$ together with the atoms connecting them form one or more rings. Examples of such olefins are 1-olefins such as ethylene, propylene, 1-butene, 1-hexene, 4-methyl-1-pentene, 1-octene, styrene, cyclic olefins such as norbornene vinylnorbornene, tetracyclododecene, ethylidenenorbornene, dienes such as 1,3-butadiene or 1,4-hexadiene, biscyclopentadiene or methyl methacrylate.

Particular preference is given to homopolymerizing propylene or ethylene, copolymerizing ethylene with one or more $C_3$–$C_{20}$-1-olefins, in particular propylene, and/or one or more $C_4$–$C_{20}$-dienes, in particular 1,3-butadiene, or copolymerizing norbornene and ethylene.

The polymerization is preferably carried out at a temperature of from −60 to 300° C., particularly preferably from 30 to 250° C. The pressure is from 0.5 to 2500 bar, preferably from 2 to 1500 bar. The polymerization can be carried out continuously or batchwise, in one or more stages, in solution, in suspension, in the gas phase or in a supercritical medium.

The supported catalyst system can either be formed directly in the polymerization system or can, as powder or while still moist with solvent, be resuspended and metered as suspension in an inert suspension medium into the polymerization system.

A prepolymerization can be carried out by means of the catalyst system of the invention. For the prepolymerization, preference is given to using the (or one of the) olefin(s) used in the polymerization.

To prepare olefin polymers having a broad molecular weight distribution, preference is given to using catalyst systems comprising two or more different transition metal compounds, e.g. metallocenes.

To remove catalyst poisons present in the olefin, purification using an aluminum alkyl, for example trimethylaluminum, triethylaluminum or triisobutylaluminum, is advantageous. This purification can be carried out either in the polymerization system itself or the olefin is brought into contact with the Al compound prior to addition to the polymerization system and is subsequently separated off again.

If necessary, hydrogen is added as molecular weight regulator and/or to increase the activity. The total pressure in the polymerization system is from 0.5 to 2500 bar, preferably from 2 to 1500 bar.

The compound described in the invention is employed in a concentration, based on the transition metal, of preferably from $10^{31\ 3}$ to $10^{-8}$, preferably from $10^{-4}$ to $10^{-7}$ mol, of transition metal per $dim^3$ of solvent or per $dim^3$ of reactor volume.

Suitable solvents for preparing both the supported chemical compound of the invention and the catalyst system of the invention are aliphatic or aromatic solvents such as hexane or toluene, ether solvents such as tetrahydrofuran or diethyl ether or halogenated hydrocarbons such as methylene chloride or halogenated aromatic hydrocarbons such as o-dichlorobenzene.

Before addition of the catalyst system of the invention or before activation of the catalyst system of the invention in the polymerization system, it is possible for an alkylaluminum compound such as trimethylaluminum, triethylaluminum, triisobutylaluminum, trioctylaluminum or isoprenylaluminum to be introduced into the reactor to make the polymerization system inert (for example to remove catalyst poisons present in the olefin). This is added to the polymerization system in a concentration of from 200 to 0.001 mmol of Al per kg of reactor contents. Preference is given to using triisobutylaluminum or triethylaluminum in a concentration of from 10 to 0.01 mmol of Al per kg of reactor contents; this enables a small $Al/M^1$ molar ratio to be employed in the synthesis of a supported catalyst system. In addition, an additive such as an antistatic can be used in the process of the invention, e.g. for improving the particle morphology of the olefin polymer. In general, it is possible to use all antistatics which are suitable for the polymerization. Examples are salt mixtures of calcium salts of Medialan and chromium salts of N-stearylanthranilic acid, which are described in DE-A-3,543,360. Further suitable antistatics are, for example, $C_{12}$–$C_{22}$- fatty acid soaps of alkali metals or alkaline earth metals, salts of sulfonic acid esters, esters of polyethylene glycols and fatty acids, polyoxyethylene alkyl ethers, etc. An overview of antistatics is given in EP-A-0,107,127.

The antistatic used can also be a mixture of a metal salt of Medialan, a metal salt of anthranilic acid and a polyamine, as described in EP-A-0,636,636.

Commercially available products such as Stadis® 450 from DuPont, a mixture of toluene, isopropanol, dodecylbenzenesulfonic acid, a polyamine, a copolymer of $_1$-decene and SO2 and also 1-decene or ASA® -3 from Shell and ARU5R® 163 from ICI can likewise be used.

The antistatic is preferably used as a solution; in the preferred case of Stadis® 450, preference is given to using from 1 to 50% by weight of this solution, more preferably from 5 to 25% by weight, based on the mass of the supported catalyst used (support together with covalently fixed metallocenium-forming compound and one or more metallocene compounds, e.g. of the formula VI). However, the required amounts of antistatic can vary within a wide range, depending on the type of antistatic used. The actual polymerization is preferably carried out in liquid monomers (bulk) or in the gas phase.

The antistatic can be added to the polymerization at any point in time. For example, a preferred procedure is to resuspend the supported catalyst system in an organic solvent, preferably an alkane such as heptane or isododecane. It is subsequently introduced into the polymerization autoclave while stirring. The antistatic is then added. The polymerization is carried out at temperatures in the range from 0 to 100° C. A further preferred procedure is to add the antistatic to the polymerization autoclave before addition of the supported catalyst system. Subsequently, the resuspended supported catalyst system is introduced while stirring at temperatures in the range from 0 to 100° C. The polymerization time can be in the range from 0.1 to 24 hours. Preference is given to a polymerization time in the range from 0.1 to 5 hours.

In the above-described process, no deposits on the reactor occur, no agglomerates are formed and the productivity of the catalyst system used is high. The polymers prepared using the process of the invention have a narrow molecular weight distribution and a good particle morphology.

The following examples serve to illustrate the invention.

General information: Preparation and handling of the compounds were carried out with exclusion of air and moisture under argon (Schlenk technique). All solvents required were dried before use by boiling for a number of hours over suitable desiccants and subsequent distillation under argon.

EXAMPLE 1

Synthesis of bis(dimethylaluminoxy) pentafluorophenylborane 10 ml of trimethylaluminum (2M in toluene, 20 mmol) and 40 ml of toluene are placed in a reaction vessel. At 40° C., 2.1 g of pentafluorophenylboronic acid (10 mmol) in 50 ml of toluene are added dropwise to this solution over a period of 15 minutes. The mixture is stirred for 1 hour at 40° C. and subsequently for a further hour at room temperature (RT). The slightly turbid, light yellow solution is filtered through a G4 frit. This gives a clear, light yellow solution (0.1M based on boron) of bis(dimethylaluminoxy) pentafluorophenylborane in toluene.

EXAMPLE 2

Synthesis of bis(pentafluorophenylboroxy) methylalane 5 ml of trimethylaluminum (2M in toluene, 10 mmol) and 45 ml of toluene are placed in a reaction vessel. At –40° C., 6.92 g of bis(pentafluorophenyl)borinic acid (20 mmol) in 50 ml of toluene are added dropwise to this solution over a period of 15 minutes. The mixture is stirred for 1 hour at 40° C. and subsequently for a further hour at room temperature. The slightly turbid, light yellow solution is filtered through a G4 frit. This gives a clear, light yellow solution (0.1M based on Al) of bis(pentafluorophenylboroxy)methylalane in toluene.

EXAMPLE 3

Synthesis of bit(phenylboroxy)methylalane 5 ml of trimethylaluminum (2M in toluene, 10 mmol) and 45 ml of toluene are placed in a reaction vessel. At 40° C., 3.32 g of bis(phenyl)borinic acid (20 mmol) in 50 ml of toluene are added dropwise to this solution over a period of 15 minutes. The mixture is stirred for 1 hour at 40° C. and subsequently for a further hour at room temperature. The slightly turbid solution is filtered through a G4 frit. This gives a clear, colorless solution (0.1 M based on Al) of bis(phenylboroxy)methylalane in toluene.

EXAMPLE 4

Synthesis of bis(pentafluorophenylboroxy) isobutylalane 10 ml of triisobutylaluminum (1M in toluene, 10 mmol) and 40 ml of toluene are placed in a reaction vessel. At −40° C., 6.92 g of bis(pentafluorophenyl)borinic acid (20 mmol) in 50 ml of toluene are added dropwise to this solution over a period of 15 minutes. The mixture is stirred for 1 hour at −40° C. and subsequently for a further hour at room temperature. The slightly turbid, light yellow solution is filtered through a G4 frit. This gives a clear, light yellow solution (0.1 M based on Al) of bis(pentafluorophenylboroxy) isobutylalane in toluene.

EXAMPLE 5

Application of bis(dimethylaluminoxy) pentafluorophenylborane to a Support 2 g of $SiO_2$ (PQ MS3030, pretreated at 140° C., 10 mbar, 10 hours) are suspended in 30 ml of toluene and, at room temperature, 0.63 ml of N,N-dimethylaniline is added. The mixture is cooled to 0° C. and 50 ml of the solution prepared in Example 1 are added dropwise via a dropping funnel. The mixture is allowed to warm to room temperature and is stirred for another 3 hours. The suspension is subsequently filtered and washed with pentane. The residue is then dried to constant weight in an oil pump vacuum. This gives 3.03 g of a pale blue support material.

EXAMPLE 6

Application of bis(pentafluorophenylboroxy) methylalane to a Support 2 g of $SiO_2$ (PQ MS3030, pretreated at 140° C., 10 mbar, 10 hours) are suspended in 30 ml of toluene and, at room temperature, 0.5 ml of N,N-dimethylaniline is added. The mixture is cooled to 0° C. and 40 ml of the solution prepared in Example 2 are added dropwise via a dropping funnel. The mixture is allowed to warm to room temperature and is stirred for another 3 hours. The suspension is subsequently filtered and washed with pentane. The residue is then dried to constant weight in an oil pump vacuum. This gives 4.01 g of a light purple support material.

EXAMPLE 7

Application of bis(phenylboroxy)methylalane to a Support 2 g of $SiO_2$ (PQ MS3030, pretreated at 140° C., 10 mbar, 10 hours) are suspended in 30 ml of toluene and, at RT, 0.63 ml of N,N-dimethylaniline is added. The mixture is cooled to 0° C. and 50 ml of the solution prepared in Example 3 are added dropwise via a dropping funnel. The mixture is allowed to warm to room temperature and is stirred for another 3 hours. The suspension is subsequently filtered and washed with pentane. The residue is then dried to constant weight in an oil pump vacuum. This gives 3.17 g of a pale yellow support material.

EXAMPLE 8

Application of bis(pentafluorophenylboroxy) isobutylalane to a Support 2 g of $SiO_2$ (PQ MS3030, pretreated at 140° C., 10 mbar, 10 hours) are suspended in 30 ml of toluene and, at room temperature, 0.63 ml of N,N-dimethylaniline is added. The mixture is cooled to 0° C. and 50 ml of the solution prepared in Example 3 are added dropwise via a dropping funnel. The mixture is allowed to come to room temperature and is stirred for another 3 hours. The suspension is subsequently filtered and washed with pentane. The residue is then dried to constant weight in an oil pump vacuum. This gives 4.22 g of a pale blue support material.

EXAMPLE 9

Preparation of Catalyst System 1

0.5 g of the support prepared in Example 5 is added at room temperature to 5.8 mg of dimethylsilanediylbis(2-methyl-4-phenylindenyl)dimethylzirconium (10)$\mu$mol) in 3 ml of toluene. The suspension is stirred briefly and 0.01 ml of trimethylaluminum (TMA) (2M in toluene, 20 $\mu$mol) is subsequently added. The catalyst solution is stirred for 1 hour and the solvent is then taken off in an oil pump vacuum. This gives a pink, free-flowing powder.

EXAMPLE 10

Polymerization Using Catalyst System 1

A dry 2 l reactor is flushed first with nitrogen and subsequently with propylene and charged with 1.5 l of liquid propylene. 3 ml of triisobutylaluminum (TIBA) (20% strength in Varsol) are added thereto and the mixture is stirred for 15 minutes. The catalyst system 1 prepared in Example 9 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 151 g of polypropylene powder (PP). The reactor displayed no deposits on the inner wall or stirrer. The catalyst activity is 26 kg of PP/g of metallocene×h.

EXAMPLE 11

Preparation of Catalyst System 2

0.43 g of the support prepared in Example 6 is added at room temperature to 5.8 mg of dimethylsilanediylbis(2-methyl-4-phenylindenyl)dimethyzirconium (10 $\mu$mol) in 3 ml of toluene. The suspension is stirred briefly and 0.01 ml of TMA (2M in toluene, 20 $\mu$mol) is subsequently added. The catalyst solution is stirred for 1 hour and the solvent is then taken off in an oil pump vacuum. This gives a pink, free-flowing powder.

EXAMPLE 12

Polymerization Using Catalyst System 2

A dry 2 l reactor is flushed first with nitrogen and subsequently with propylene and charged with 1.5 l of liquid propylene. 3 ml of TIBA (20% strength in Varsol) are added thereto and the mixture is stirred for 15 minutes. The catalyst system 2 prepared in Example 11 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 272 g of polypropylene powder. The reactor displayed no deposits on the inner wall or stirrer. The catalyst activity is 47 kg of PP/g of metallocene×h.

EXAMPLE 13

Preparation of Catalyst System 3

0.43 g of the support prepared in Example 6 is added at room temperature to 5.8 mg of dimethylsilanediylbis(2-methyl-4-phenylindenyl)dimethylzirconium (10 μmol) in 3 ml of toluene. The catalyst solution is stirred for 1 hour and the solvent is then taken off in an oil pump vacuum. This gives a pink, free-flowing powder.

EXAMPLE 14

Polymerization Using Catalyst System 3

A dry 2 l reactor is flushed first with nitrogen and subsequently with propylene and charged with 1.5 l of liquid propylene. 3 ml of TIBA (20% strength in Varsol) are added thereto and the mixture is stirred for 15 minutes. The catalyst system 3 prepared in Example 13 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 214 g of polypropylene powder. The reactor displayed no deposits on the inner wall or stirrer. The catalyst activity is 37 kg of PP/g of metallocene×h.

EXAMPLE 15

Preparation of Catalyst System 4

0.91 g of the support prepared in Example 7 is added at room temperature to 5.8 mg of dimethylsilanediylbis(2-methyl-4-phenylindenyl)dimethylzirconium (10 μmol) in 3 ml of toluene. The suspension is stirred briefly and 0.01 ml of TMA (2M in toluene, 20 μmol) is subsequently added. The catalyst solution is stirred for 1 hour and the solvent is then taken off in an oil pump vacuum. This gives a pink, free-flowing powder.

EXAMPLE 16

Polymerization Using Catalyst System 4

A dry 2 l reactor is flushed first with nitrogen and subsequently with propylene and charged with 1.5 l of liquid propylene. 3 ml of TIBA (20% strength in Varsol) are added thereto and the mixture is stirred for 15 minutes. The catalyst system 4 prepared in Example 15 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 166 g of polypropylene powder. The reactor displayed no deposits on the inner wall or stirrer. The catalyst activity is 29 kg of PP/g of metallocene×h.

EXAMPLE 17

Preparation of Catalyst System 5

0.44 g of the support prepared in Example 8 is added at room temperature to 5.8 mg of dimethylsilanediylbis(2-methyl-4-phenylindenyl)dimethylzirconium (10 μmol) in 3 ml of toluene. The suspension is stirred briefly and 0.01 ml of TMA (2M in toluene, 20 μmol) is subsequently added. The catalyst solution is stirred for 1 hour and the solvent is then taken off in an oil pump vacuum. This gives a pink, free-flowing powder.

EXAMPLE 18

Polymerization Using Catalyst System 5

A dry 2 l reactor is flushed first with nitrogen and subsequently with propylene and charged with 1.5 l of liquid propylene. 3 ml of TIBA (20% strength in Varsol) are added thereto and the mixture is stirred for 15 minutes. The catalyst system 5 prepared in Example 17 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 258 g of polypropylene powder. The reactor displayed no deposits on the inner wall or stirrer. The catalyst activity is 45 kg of PP/g of metallocene×h.

EXAMPLE 19

Preparation of Catalyst System 6

0.44 g of the support prepared in Example 8 is added at room temperature to 5.8 mg of dimethylsilanediylbis(2-methyl-4-phenylindenyl)dimethylzirconium (10 μmol) in 3 ml of toluene. The catalyst solution is stirred for 1 hour and the solvent is then taken off in an oil pump vacuum. This gives a pink, free-flowing powder.

EXAMPLE 20

Polymerization Using Catalyst System 6

A dry 2 l reactor is flushed first with nitrogen and subsequently with propylene and charged with 1.5 l of liquid propylene. 3 ml of TIBA (20% strength in Varsol) are added thereto and the mixture is stirred for 15 minutes. The catalyst system 6 prepared in Example 19 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 198 g of polypropylene powder. The reactor displayed no deposits on the inner wall or stirrer. The catalyst activity is 34 kg of PP/g of metallocene×h.

EXAMPLE 21

Preparation of Catalyst System 7

6.3 mg of dimethylsilanediylbis(2-methyl-4-phenylindenyl)zirconium dichloride (10 μmol) in 3 ml of toluene are stirred for 10 minutes with 0.02 ml of TMA (2M in toluene, 40 μmol). 0.44 g of the support prepared in Example 6 is subsequently added at room temperature. The catalyst solution is stirred for 1 hour and the solvent is then taken off in an oil pump vacuum. This gives a pink, free-flowing powder.

EXAMPLE 22

Polymerization Using Catalyst System 7

A dry 2 l reactor is flushed first with nitrogen and subsequently with propylene and charged with 1.5 l of liquid propylene. 3 ml of TIBA (20% strength in Varsol) are added thereto and the mixture is stirred for 15 minutes. The catalyst system 7 prepared in Example 21 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 600 g of polypropylene powder. The reactor displayed no deposits on the inner wall or stirrer. The catalyst activity is 95 kg of PP/g of metallocene×h.

EXAMPLE 23

Application of bis(pentafluorophenylboroxy) methylalane to a Support 2 g of $SiO_2$ (PQ MS3030, pretreated at 140° C., 10 mbar, 10 hours) are suspended in 30 ml of toluene and, at room temperature, 0.5 ml of N,N-dimethylaniline is added. The mixture is cooled to 0° C. and 40 ml of the solution prepared in Example 2 are added dropwise via a dropping funnel. The mixture is allowed to warm to room temperature and 4 ml of TIBA (1M in toluene) are subsequently added dropwise. The mixture is then stirred for another 1 hour at room temperature. The suspension is subsequently filtered and washed with pentane. The residue is then dried to constant weight in an oil pump vacuum. This gives 4.14 g of a white support material.

EXAMPLE 24

Preparation of Catalyst System 8

6.3 mg of dimethylsilanediylbis(2-methyl-4-phenylindenyl)zirconium dichloride (10 μmol) in 3 ml of toluene are stirred for 10 minutes with 0.02 ml of TMA (2M in toluene, 40 μmol). 0.48 g of the support prepared in Example 23 is subsequently added at room temperature. The catalyst solution is stirred for 1 hour and the solvent is then taken off in an oil pump vacuum. This gives a pink, free-flowing powder.

EXAMPLE 25

Polymerization Using Catalyst System 8

A dry 2 l reactor is flushed first with nitrogen and subsequently with propylene and charged with 1.5 l of liquid propylene. 3 ml of TIBA (20% strength in Varsol) are added thereto and the mixture is stirred for 15 minutes. The catalyst system 8 prepared in Example 24 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 640 g of polypropylene powder. The reactor displayed no deposits on the inner wall or stirrer. The catalyst activity is 102 kg of PP/g of metallocene×h.

COMPARATIVE EXAMPLES

EXAMPLE 26

Preparation of Catalyst System 9

100 mg (0.165 mmol) of dimethylsilanediylbis(2-methyl-4-phenylindenyl)zirconium dichloride are mixed with 7.5 ml of 30% strength MAO solution in toluene (Al/Zr=225) and a further 7.5 ml of toluene and stirred for 30 minutes at room temperature. 10 g of $SiO_2$ (PQ MS3030, pretreated at 140° C., 10 mbar, 10 hours) are subsequently added thereto and the mixture is stirred for a further 10 minutes. The solvent is removed in an oil pump vacuum.

EXAMPLE 27

Polymerization Using Catalyst System 9

A dry 2 l reactor is flushed first with nitrogen and subsequently with propylene and charged with 1.5 l of liquid propylene. 3 ml of TIBA (20% strength in Varsol) are added thereto and the mixture is stirred for 15 minutes. 0.753 g (5.97 mg of dimethylsilanediylbis(2-methyl-4-phenylindenyl)zirconium dichloride) of the catalyst system 9 prepared in Example 26 and resuspended in 20 ml of heptane is subsequently injected and rinsed in using 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 316 g of polypropylene powder. The reactor displayed no deposits on the inner wall or stirrer. The catalyst activity is 53 kg of PP/g of metallocene×h.

What is claimed is:

1. A catalyst system comprising a) at least one metallocene, b) at least one Lewis base of the formula I $$M^2R^3R^4R^5 \qquad (I)$$

where $R^3$, $R^4$ and $R^5$ are identical or different and are each a hydrogen atom, a $C_1$–$C_{20}$-alkyl group, $C_1$–$C_{20}$-haloalkyl group, $C_6$–$C_{40}$-aryl group, $C_6$–$C_{40}$-haloaryl group, $C_7$–$C_{40}$-alkylaryl group or $C_7$–$C_{40}$-arylalkyl group, where two radicals or all three radicals $R^3$, $R^4$ and $R^5$ may be connected to one another via $C_2$–$C_{20}$-units, and $M^2$ is an element of main group V of the Periodic Table of the Elements, c) a support, d) at least one organoboroaluminum compound which is built up of units of the formula II $$R_i^1M^3\text{—}O\text{—}M^3R_j^2 \qquad (II)$$

where $R^1$ and $R^2$ are identical or different and are each a hydrogen atom, a halogen atom, a $C_1$–$C_{40}$-group, or $R^1$ is an $OSiR_3$ group, where R are identical or different and are as defined for $R^1$, $M^3$ are identical or different and are each an element of main group III of the Periodic Table of the Elements and i and j are each an integer 0, 1 or 2, and is covalently bound to the support, and, if desired, e) an organometallic compound of the formula V $$[M^4R^6{}_p]_k \qquad V$$

where $M^4$ is an element of main group I, II or III of the Periodic Table of the Elements, $R^6$ are different and are each a hydrogen atom, a halogen atom or a $C_1$–$C_{40}$-group, p is an integer from 1 to 3 and k is an integer from 1 to 4.

2. A catalyst system as claimed in claim 1, wherein the Lewis bases of the formula (I) are ones in which $M^2$ is nitrogen or phosphorus.

3. A catalyst system as claimed in claim 2, wherein the Lewis bases of the formula (I) are triethylamine, triisopropylamine, triisobutylamine, tri(n-butyl)amine, N,N-dimethylaniline, N,N-diethylaniline, N,N-2,4,6-pentamethylaniline, dicyclohexylamine, pyridine, pyrazine, triphenylphosphine, tri(methylphenyl)phosphine and tri (dimethylphenyl)phosphine.

4. A catalyst system as claimed in claim 1, wherein the support is a porous inorganic or organic solid.

5. A catalyst system as claimed in claim 1, wherein the organoboroaluminum compound is one in which $M^3$ in the formula (II) is boron or aluminum.

6. A catalyst system as claimed in claim 1, wherein the organoboroaluminum compounds are compounds of the formulae (III) and (IV)

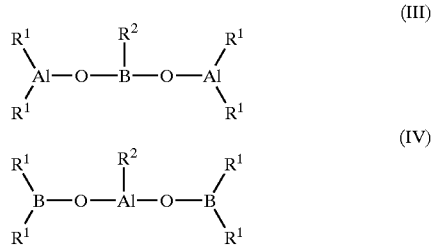

where $R^1$ and $R^2$ are as defined under formula (II).

7. A catalyst system as claimed in claim 6, wherein the organoboroaluminum compounds of the formulae (III) and (IV) are

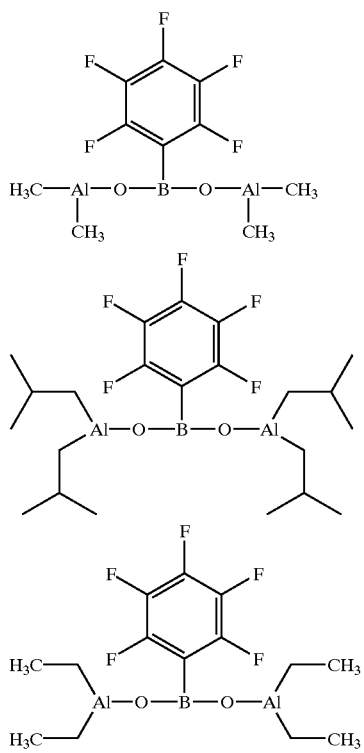

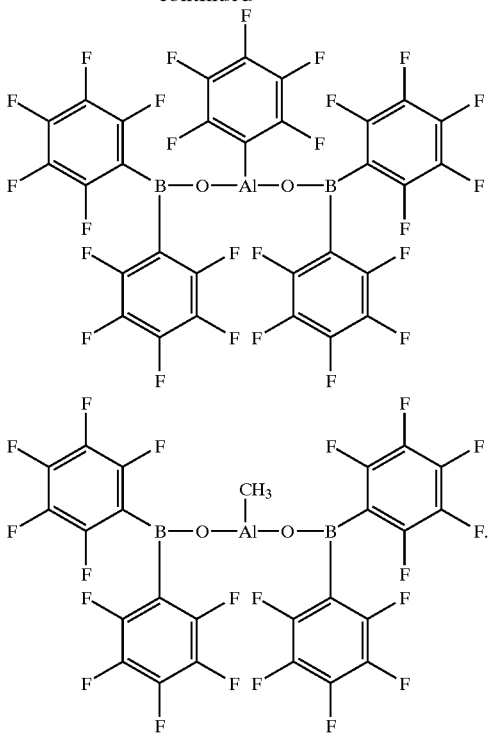

8. A catalyst system as claimed in claim 1, wherein the organometallic compound of the formula (V) is trimethylaluminum, triethylaluminum, triisopropylaluminum, trihexylaluminum, trioctylaluminum, tri-n-butylaluminum, tri-n-propylaluminum, triisoprenylaluminum, dimethylaluminum monochloride, diethylaluminum monochloride, diisobutylaluminum monochloride, methylaluminum sesquichloride, ethylaluminum sesquichloride, dimethylaluminum hydride, diethylaluminum hydride, diisopropylaluminum hydride, dimethylaluminum trimethylsiloxide, dimethylaluminum triethylsiloxide, phenylalane, pentafluorophenylalane or o-tolylalane.

9. A catalyst system as claimed in claim 1, wherein the metallocene is an unbridged or bridged metallocene of the formula (VI),

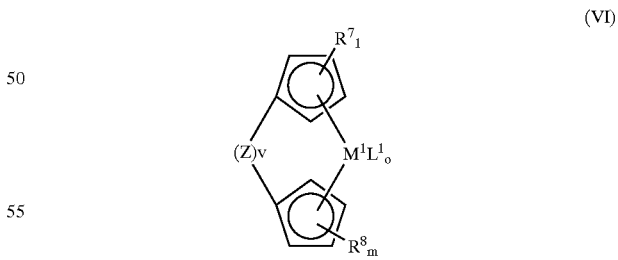

where $M^1$ is a metal of transition group III, IV, V or VI of the Periodic Table of the Elements, $R^7$ are identical or different and are each a hydrogen atom or $SiR_3^{12}$, where $R^{12}$ are identical or different and are each a hydrogen atom or a $C_1$–$C_{40}$-group or $R^7$ are each a $C_1$–$C_{30}$-group or two or more radicals $R^7$ can be connected to one another such that the radicals $R^7$ and the atoms of the cyclopentadienyl ring which connect them form a carboxylic or heterocyclic $C_4$–$C_{24}$-ring system which may in turn be substituted, $R^8$ are identical or different and are each a hydrogen atom or $SiR_3^{12}$, where $R^{12}$ are identical or different and are each a hydrogen atom or a $C_1$–$C_{40}$-group or $R^8$ are each a $C_1$–$C_{30}$-group or two or more radicals $R^8$ can be connected to one another such that the radicals $R^8$ and the atoms of the cyclopentadienyl ring which connect them for a carbocyclic or heterocyclic $C_4$–$C_{24}$-ring system which may in turn be substituted, l is 5 when v=0, and l is 4 when v=1, m is 5 when v=0, and m is 4 when v=1, $L^1$ can be identical or different and are each a hydrogen atom, a $C_1$–$C_{10}$-hydrocarbon group, a halogen atom or $OR^9$, $SR^9$, $OSiR_3^9$, $SiR_3^9$, $PR_2^9$ or $NR_2^9$, where $R^9$ is a halogen atom, a $C_1$–$C_{10}$-alkyl group, a halogenated $C_{1–C10}$-alkyl group, a $C_6$–$C_{20}$-aryl group or a halogenated $C_6$–$C_{20}$-aryl group, or $L^1$ are each a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, Z is a bridging structural element between the two cyclopentadienyl rings and v is 0 or 1.

10. A catalyst system as claimed in claim 9, wherein the metallocene of the formula (VI) is one in which Z is an $MR^{10}R^{11}$ group, where M is carbon, silicon, germanium or tin and $R^{10}$ and $R^{11}$ are identical or different $C_1$–$C_{20}$-hydrocarbon-containing groups.

11. A catalyst system as claimed in claim 9, wherein the metallocene of the formula (VI) is one in which Z is $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, o—$C_6H_4$ or 2,2'-$(C_6H_4)_2$.

12. A catalyst system as claimed in claim 11, wherein the metallocene used is dimethylsilanediylbis(indenyl)zirconium dichloride, dimethylsilanediylbis(4-naphthylindenyl)zirconium dichloride, dimethylsilanediylbis(2-methylbenzindenyl)zirconium dichloride, dimethylsilanediylbis(2-methylindenyl)zirconium dichloride, dimethylsilanediylbis(2-methyl-4-(1-naphthyl)indenyl) zirconium dichloride, dimethylsilanediylbis(2-methyl-4-(2-naphthyl)indenyl) zirconium dichloride, dimethylsilanediylbis(2-methyl-4-phenylindenyl) zirconium dichloride, dimethylsilanediylbis(2-methyl-4-t-butylindenyl) zirconium dichloride, dimethylsilanediylbis(2-methyl-4-isopropylindenyl) zirconium dichloride, dimethylsilanediylbis(2-methyl-4-ethylindenyl) zirconium dichloride, dimethylsilanediylbis(2-methyl-4-acenaphthindenyl) zirconium dichloride, dimethylsilanediylbis(2,4-dimethylindenyl)zirconium dichloride, dimethylsilanediylbis(2-ethylindenyl)zirconium dichloride, dimethylsilanediylbis(2-ethyl-4-ethylindenyl)zirconium dichloride, dimethylsilanediylbis(2-ethyl-4-phenylindenyl) zirconium dichloride, dimethylsilanediylbis(2-methyl-4,5-benzindenyl) zirconium dichloride, dimethylsilanediylbis(2-methyl-4,6-diisopropylindenyl) zirconium dichloride, dimethylsilanediylbis(2-methyl-4,5-diisopropylindenyl) zirconium dichloride, dimethylsilanediylbis(2,4,6-trimethylindenyl)zirconium dichloride, dimethylsilanediylbis(2,5,6-trimethylindenyl)zirconium dichloride, dimethylsilanediylbis(2,4,7-trimethylindenyl)zirconium dichloride, dimethylsilanediylbis(2-methyl-5-isobutylindenyl) zirconium dichloride, dimethylsilanediylbis(2-methyl-5-t-butylindenyl) zirconium dichloride, methyl(phenyl)silanediylbis(2-methyl-4-phenylindenyl) zirconium dichloride, methyl(phenyl)silanediylbis(2-methyl-4,6-prhylindenyl) zirconium dichloride , methyl(phenyl)silanediylbis(2-methyl-4-disopropylindenyl)zirconium dichloride, methyl(phenyl)silanediylbis(2-methyl-4,5-benzindenyl) zirconium dichloride, methyl(phenyl)silanediylbis(2-methyl-4,5-(methylbenz) indenyl)zirconium dichloride, methyl(phenyl)silanediylbis(2-methyl-4,5-(tetramethylbenz)indenyl)zirconium dichloride, methyl(phenyl)silanediylbis(2-methyl-4-acenaphthindenyl)zirconium dichloride, methyl(phenyl)silanediylbis(2-methylindenyl)zirconium dichloride, methyl(phenyl)silanediylbis(2-methyl-5-isobutylindenyl) zirconium dichloride, 1,2-ethanediylbis(2-methyl-4-phenylindenyl)zirconium dichloride, 1,4-butanediylbis(2-methyl-4-phenylindenyl)zirconium dichloride, 1,2-ethanediylbis(2-methyl-4,6-diisopropylindenyl) zirconium dichloride, 1,4-butanediylbis(2-methyl-4-isopropylindenyl) zirconium dichloride, 1,4-butanediylbis(2-methyl-4,5-benzindenyl)zirconium dichloride, 1,2-ethanediylbis(2-methyl-4,5-benzindenyl)zirconium dichloride, 1,2-ethanediylbis(2,4,7-trimethylindenyl)zirconium dichloride, 1,2-ethanediylbis(2-methylindenyl)zirconium dichloride, 1,4-butanediylbis(2-methylindenyl)zirconium dichloride,

[4-($\eta^5$-cyclopentadienyl)-4,6,6-trimethyl($\eta^5$-4,5-tetrahydropentalene)]dichlorozirconium,

[4-($\eta^5$-3'-trimethylsilylcyclopentadienyl)-4,6,6-trimethyl ($\eta^5$-4,5-tetrahydropentalene)]dichlorozirconium,

[4-($\eta^5$-3'-isopropylcyclopentadienyl)-4,6,6-trimethyl($\eta^5$-4,5-tetrahydropentalene)]dichlorozirconium,

[4-($\eta^5$-cyclopentadienyl)-4,7,7-trimethyl($\eta^5$-4,5,6,7-tetrahydroindenyl)]dichlorotitanium,

[4-($\eta^5$-cyclopentadienyl)-4,7,7-trimethyl($\eta^5$-4,5,6,7-tetrahydroindenyl)]dichlorozirconium,

[4-(η⁵-cyclopentadienyl)-4,7,7-trimethyl(η⁵-4,5,6,7-tetrahydroindenyl)]dichlorohafnium,

[4-(η⁵-3-tert-butylcyclopentadienyl)-4,7,7-trimethyl(η⁵-4,5,6,7-tetrahydroindenyl)]dichlorotitanium, 4-(η⁵-3-isopropylcyclopentadienyl)-4,7,7-trimethyl(η⁵-4,5,6,7-tetrahydroindenyl)]dichlorotitanium, 4-(η⁵-3-methylcyclopentadienyl)-4,7,7-trimethyl(η⁵-4,5,6,7-tetrahydroindenyl)]dichlorotitanium, 4-(η⁵-3-trimethylsilylcyclopentadienyl)-2-trimethylsilyl-4,7,7-trimethyl(η⁵-4,5,6,7-tetrahydroindenyl)]dichlorotitanium, 4-(η⁵-3-tert-butylcyclopentadienyl)-4,7,7-trimethyl(η⁵-4,5,6,7-tetrahydroindenyl)]dichlorozirconium, (tert-butylamido)(tetramethyl-η⁵-cyclopentadienyl)dimethylsilyldichlorotitanium, (tert-butylamido)(tetramethyl-η⁵-cyclopentadienyl)-1,2-ethanediyldichlorotitanium, (methylamido)(tetramethyl-η⁵-cyclopentadienyl)dimethylsilyldichlorotitanium, (methylamido)(tetramethyl-η⁵-cyclopentadienyl)-1,2-ethanediyldichlorotitanium, (tert-butylamido)(2,4-dimethyl-2,4-pentadien-1-yl)dimethylsilyldichlorotitanium, bis(cyclopentadienyl)zirconium dichloride, bis(n-butylcyclopentadienyl)zirconium dichloride, bis(1,3-dimethylcyclopentadienyl)zirconium dichloride, tetrachloro[1-[bis(η⁵-1H-inden-1-ylidene)methylsilyl]-3-η⁵-cyclopenta-2,4-dien-1-ylidene)-3-η⁵-9H-fluoren-9-ylidene)butane]dizirconium, tetrachloro[2-[bis(η⁵-2-methyl-1H-inden-1-ylidene)methoxysilyl]-5-(η⁵-2,3,4,5-tetramethylcyclopenta-2,4-dien-1-ylidene)-5-(η⁵-9H-fluoren-9-ylidene)hexane]dizirconium, tetrachloro[1-[bis(η⁵-1H-inden-1-ylidene)methylsilyl]6-(η⁵-cyclopenta-2,4-dien-1-ylidene)-6-(η⁵-9H-fluoren-9-ylidene)-3-oxaheptane]dizirconium, dimethylsilanediylbis(2-methyl-4-(4'-tert-butylphenylindenyl)zirconium dichloride, dimethylsilanediylbis(2-methyl-4-(4'-methylphenylindenyl)zirconium dichloride, dimethylsilanediylbis(2-methyl-4-(4'-ethylphenylindenyl)zirconium dichloride, dimethylsilanediylbis(2-methyl-4-(4'-trifuoromethylphenylindenyl)zirconium dichloride, dimethylsilanediylbis(2-methyl-4-(4'-methoxyphenylindenyl)zirconium dichloride, dimethylsilanediylbis(2-ethyl-4-(4'-tert-butylphenylindenyl)zirconium dichloride, dimethylsilanediylbis(2-ethyl-4-(4'-methylphenylindenyl)zirconium dichloride, dimethylsilanediylbis(2-ethyl-4-(4'-ethylphenylindenyl)zirconium dichloride, dimethylsilanediylbis(2-ethyl-4-(4'-trifluoromethylphenylindenyl)zirconium dichloride, dimethylsilanediylbis(2-ethyl-4-(4'-methoxyphenylindenyl)zirconium dichloride, dimethylsilanediylbis(2-methyl-4-(4'-tert-butylphenylindenyl)dimethyl-zirconium, dimethylsilanediylbis(2-methyl-4-(4'-methylphenylindenyl)dimethylzirconium, dimethylsilanediylbis(2-methyl-4-(4'-ethylphenylindenyl)dimethylzirconium, dimethylsilanediylbis(2-methyl-4-(4'-trifluoromethylphenylindenyl)dimethylzirconium, dimethylsilanediylbis(2-methyl-4-(4'-methoxyphenylindenyl)dimethylzirconium, dimethylsilanediylbis(2-ethyl-4-(4'-tert-butylphenylindenyl)dimethylzirconium, dimethylsilanediylbis(2-ethyl-4-(4'-methylphenylindenyl)dimethylzirconium, dimethylsilanediylbis(2-ethyl-4-(4'-ethylphenylindenyl)dimethylzirconium, dimethylsilanediylbis(2-ethyl-4-(4'-trifluoromethylphenylindenyl)dimethylzirconium, dimethylsilanediylbis(2-ethyl-4-(4'-methoxyphenylindenyl)dimethylzirconium, dimethylsilanediylbis(2-methyl-4-(4'-trimethylsifylphenylindenyl)zirconium dichloride, dimethylsilanediylbis(2-methyl-4-(4'-trimethylsilylphenylindenyl)dimethylzirconium, dimethylsilanediylbis(2-ethyl-4-(4'-trimethylsilylphenylindenyl)zirconium dichloride, dimethylsilanediylbis(2-ethyl-4-(4'-trimethylsilylphenylindenyl)dimethyl-zirconium dimethylsilanediylbis(2-methyl-4-(4'-tert-butylphenyl)indenyl)hafnium dichloride dimethylsilanediylbis(2-methyl-4-(4'-tert-butylphenyl)indenyl)titanium dichloride dimethylsilanediylbis(2-methyl-4-(4'-methylphenyl)indenyl)zirconium dichloride dimethylsilanediylbis(2-methyl-4-(4'-n-propylphenyl)indenyl)zirconium dichloride dimethylsilanediylbis(2-methyl-4-(4'-n-butylphenyl)indenyl)zirconium dichloride dimethylsilanediylbis(2-methyl-4-(4'-hexylphenyl)indenyl)zirconium dichloride dimethylsilanediylbis(2-methyl-4-(4'-sec-butylphenyl)indenyl)zirconium dichloride dimethylsilanediylbis(2-ethyl-4-phenyl)indenyl)zirconium dichloride dimethylsilanediylbis(2-ethyl-4-(4'-methylphenyl)indenyl)zirconium dichloride dimethylsilanediylbis(2-ethyl-4-(4'-ethylphenyl)indenyl)zirconium dichloride dimethylsilanediylbis(2-ethyl-4-(4'-n-propylphenyl)indenyl)zirconium dichloride dimethylsilanediylbis(2-ethyl-4-(4'-n-butylphenyl)indenyl)zirconium dichloride dimethylsilanediylbis(2-ethyl-4-(4'-hexylphenyl)indenyl)zirconium dichloride dimethylsilanediylbis(2-ethyl-4-(4'-pentylphenyl)indenyl)zirconium dichloride dimethylsilanediylbis(2-ethyl-4-(4'-cyclohexylphenyl)indenyl)zirconium dichloride dimethylsilanediylbis(2-ethyl-4-(4'-sec-butylphenyl)indenyl)zirconium dichloride dimethylsilanediylbis(2-ethyl-4-(4'-tert-butylphenyl)indenyl)zirconium dichloride dimethylsilanediylbis(2-n-propyl-4-phenyl)indenyl)zirconium dichloride dimethylsilanediylbis(2-n-propyl-4-(4'-methylphenyl)indenyl)zirconium dichloride dimethylsilanediylbis(2-n-propyl-4-(4'-ethylphenyl)indenyl)zirconium dichloride dimethylsilanediylbis(2-n-propyl-4-(4'-iso-propylphenyl)indenyl)zirconium dichloride dimethylsilanediylbis(2-n-propyl-4-(4'-n-butylphenyl)indenyl)zirconium dichloride dimethylsilanediylbis(2-n-propyl-4-(4'-hexylphenyl)indenyl)zirconium dichloride dimethylsilanediylbis(2-n-propyl-4-(4'-cyclohexylphenyl)indenyl)zirconium dichloride dimethylsilanediylbis(2-n-propyl-4-(4'-sec-butylphenyl)indenyl)zirconium dichloride dimethylsilanediylbis(2-n-propyl-4-(4'-tert-butylphenyl)indenyl)zirconium dichloride dimethylsilanediylbis(2-n-butyl-4-phenyl)indenyl)zirconium dichloride dimethylsilanediylbis(2-n-butyl-4-(4'-methylphenyl)indenyl)zirconium dichloride dimethylsilanediylbis(2-n-butyl-4-(4'-ethylphenyl)indenyl)zirconium dichloride dimethylsilanediylbis(2-n-butyl-4-(4'-n-propylphenyl)indenyl)zirconium dichloride dimethylsilanediylbis(2-n-butyl-4-(4'-iso-propylphenyl)indenyl)zirconium dichloride dimethylsilanediylbis(2-n-butyl-4-(4'-n-butylphenyl)indenyl)zirconium dichloride dimethylsilanediylbis(2-n-butyl-4-(4'-hexylphenyl)indenyl)zirconium dichloride dimethylsilanediylbis(2-n-butyl-4-(4'-cyclohexylphenyl)indenyl)zirconium dichloride dimethylsilanediylbis(2-n-butyl-4-(4'-sec-butylphenyl)indenyl)zirconium dichloride dimethylsilanediylbis(2-n-butyl-4-(4'-tert-butylphenyl)indenyl)zirconium dichloride dimethylsilanediylbis(2-hexyl-4-phenyl)indenyl)zirconium dichloride dimethylsilanediylbis(2-hexyl-4-(4'-methylphenyl)indenyl)zirconium dichloride dimethylsilanediylbis(2-hexyl-4-(4'-ethylphenyl)indenyl)zirconium dichloride dimethylsilanediylbis(2-hexyl-4-(4'-n-propylphenyl)indenyl)zirconium dichloride dimethylsilanediylbis(2-hexyl-4-(4'-iso-propylphenyl)indenyl)zirconium dichloride dimethylsilanediylbis(2-hexyl-4-(4'-n-butylphenyl)indenyl)zirconium dichloride dimethylsilanediylbis(2-hexyl-4-(4'-hexylphenyl)indenyl)zirconium dichloride dimethylsilanediylbis(2-hexyl-4-(4'-cyclohexylphenyl)indenyl)zirconium dichloride dimethylsilanediylbis(2-hexyl-4-(4'-sec-butylphenyl)indenyl)zirconium dichloride dimethylsilanediylbis(2-hexyl-4-(4'-tert-butylphenyl)indenyl)zirconium dichloride dimethylsilanediylbis(2-methyl-4-(4'-tert-butylphenyl)indenyl)zirconium bis(dimethylamide)

dimethylsilanediylbis(2-ethyl-4-(4'-tert-butylphenyl)indenyl)dibenzylzirconium dimethylsilanediylbis(2-methyl-4-(4'-tert-butylphenyl)indenyl)dimethylzirconium dimethylgermanediylbis(2-ethyl-4-(4'-tert-butylphenyl)indenyl)zirconium dichloride dimethylgermanediylbis(2-ethyl-4-(4'-tert-butylphenyl)indenyl)hafnium dichloride dimethylgermanediylbis(2-propyl-4-(4'-tert-butylphenyl)indenyl)titanium dichloride dimethylgermanediylbis(2-methyl-4-(4'-tert-butylphenyl)indenyl)zirconium dichloride ethylidenebis(2-ethyl-4-phenyl)indenyl)zirconium dichloride ethylidenebis(2-ethyl-4-(4'-tert-butylphenyl)indenyl)zirconium dichloride ethylidenebis(2-n-propyl-4-(4'-tert-butylphenyl)indenyl)zirconium dichloride ethylidenebis(2-n-butyl-4-(4'-tert-butylphenyl)indenyl)titanium dichloride ethylidenebis(2-hexyl-4-(4'-tert-butylphenyl)indenyl)dibenzylzirconium ethylidenebis(2-ethyl-4-(4'-tert-butylphenyl)indenyl)dibenzylhafnium ethylidenebis(2-methyl-4-(4'-tert-butylphenyl)indenyl)dibenzyltitanium ethylidenebis(2-methyl-4-(4'-tert-butylphenyl)indenyl)zirconium dichloride ethylidenebis(2-ethyl-4-(4'-tert-butylphenyl)indenyl)dimethylhafnium ethylidenebis(2-n-propyl-4-phenyl)indenyl)dimethyltitanium ethylidenebis(2-ethyl-4-(4'-tert-butylphenyl)indenyl)zirconium bis(dimethylamide)

ethylidenebis(2-ethyl-4-(4'-tert-butylphenyl)indenyl)hafnium bis(dimethylamide)

ethylidenebis(2-ethyl-4-(4'-tert-butylphenyl)indenyl)titanium bis(dimethylamide)

methylethylidenebis(2-ethyl-4-(4'-tert-butylphenyl)indenyl)zirconium dichloride methylethylidenebis(2-ethyl-4-(4'-tert-butylphenyl)indenyl)hafnium dichloride phenylphosphinediyl(2-ethyl-4-(4'-tert-butylphenyl)indenyl)zirconium dichloride phenylphosphinediyl(2-methyl-4-(4'-tert-butylphenyl)indenyl)zirconium dichloride phenylphosphinediyl(2-ethyl-4-(4'-tert-butylphenyl)indenyl)zirconium dichloride dimethylsilanediyl(2-methyl-4-azapentalene)(2-methyl-4-(4'-methylphenylindenyl)zirconium dichloride dimethylsilanediyl(2-methyl-5-azapentalene)(2-methyl-4-(4'-methylphenylindenyl)zirconium dichloride dimethylsilanediyl(2-methyl-6-azapentalene)(2-methyl-4-(4'-methylphenylindenyl)zirconium dichloride dimethylsilanediyl(2-methyl-N-phenyl-4-azapentalene)(2-methyl-4-(4'-methylphenylindenyl)zirconium dichloride dimethylsilanediyl(2-methyl-N-phenyl-5-azapentalene)(2-methyl-4-(4'-methylphenylindenyl)zirconium dichloride dimethylsilanediyl(2-methyl-N-phenyl-6-azapentalene)(2-methyl-4-(4'-methylphenylindenyl)zirconium dichloride dimethylsilanediyl(2,5-dimethyl-4-azapentalene)(2-methyl-4-(4'-methylphenylindenyl)zirconium dichloride dimethylsilanediyl(2,5-dimethyl-6-azapentalene)(2-methyl-4-(4'-methylphenylindenyl)zirconium dichloride dimethylsilanediyl(2,5-dimethyl-N-phenyl-4-azapentalene)(2-methyl-4-(4'-methylphenylindenyl)zirconium dichloride dimethylsilanediyl(2,5-dimethyl-N-phenyl-6-azapentalene)(2-methyl-4-(4'-methylphenylindenyl)zirconium dichloride dimethylsilanediyl(2-methyl-4-thiapentalene)(2-methyl-4-(4'-methylphenylindenyl)zirconium dichloride dimethylsilanediyl(2-methyl-5-thiapentalene)(2-methyl-4-(4'-methylphenylindenyl)zirconium dichloride dimethylsilanediyl(2-methyl-6-thiapentalene)(2-methyl-4-(4'-methylphenylindenyl)zirconium dichloride dimethylsilanediyl(2,5-dimethyl-4-thiapentalene)(2-methyl-4-(4'-methylphenylindenyl)zirconium dichloride dimethylsilanediyl(2,5-dimethyl-6-thiapentalene)(2-methyl-4-(4'-methylphenylindenyl)zirconium dichloride dimethylsilanediyl(2-methyl-4-oxapentalene)(2-methyl-4-(4'-methylphenylindenyl)zirconium dichloride dimethylsilanediyl(2-methyl-5-oxapentalene)(2-methyl-4-(4'-methylphenylindenyl)zirconium dichloride dimethylsilanediyl(2-methyl-6-oxapentalene)(2-methyl-4-(4'-methylphenylindenyl)zirconium dichloride dimethylsilanediyl(2,5-dimethyl-4-oxapentalene)(2-methyl-4-(4'-methylphenylindenyl)zirconium dichloride dimethylsilanediyl(2,5-dimethyl-6-oxapentalene)(2-methyl-4-(4'-methylphenylindenyl)zirconium dichloride dimethylsilanediyl(2-methyl4-azapentalene)(2methyl-4-(4'-ethylphenylindenyl)zirconium dichloride dimethylsilanediyl(2-methyl-5-azapentalene)(2-methyl-4-(4'-ethylphenylindenyl)zirconium dichloride dimethylsilanediyl(2-methyl-6-azapentalene)(2-methyl-4-(4'-ethylphenylindenyl)zirconium dichloride dimethylsilanediyl(2-methyl-N-phenyl-4-azapentalene)(2-methyl-4-(4'-ethylphenylindenyl)zirconium dichloride dimethylsilanediyl(2-methyl-N-phenyl-5-azapentalene)(2-methyl-4-(4'-ethylphenylindenyl)zirconium dichloride dimethylsilanediyl(2-methyl-N-phenyl-6-azapentalene)(2-methyl-4-(4'-ethylphenylindenyl)zirconium dichloride dimethylsilanediyl(2,5-dimethyl-4-azapentalene)(2-methyl-4-(4'-ethylphenylindenyl)zirconium dichloride dimethylsilanediyl(2,5-dimethyl-6-azapentalene)(2-methyl-4-(4'-ethylphenylindenyl)zirconium dichloride dimethylsilanediyl(2,5-dimethyl-N-phenyl-4-azapentalene)(2-methyl-4-(4'-ethylphenylindenyl)zirconium dichloride dimethylsilanediyl(2,5-dimethyl-N-phenyl-6-azapentalene)(2-methyl-4-(4'-ethylphenylindenyl)zirconium dichloride dimethylsilanediyl(2-methyl-4-thiapentalene)(2-methyl-4-(4'-ethylphenylindenyl)zirconium dichloride dimethylsilanediyl(2-methyl-5-thiapentalene)(2-methyl-4-(4'-ethylphenylindenyl)zirconium dichloride dimethylsilanediyl(2-methyl-6-thiapentalene)(2-methyl-4-(4'-ethylphenylindenyl)zirconium dichloride dimethylsilanediyl(2,5-dimethyl-4-thiapentalene)(2-methyl-4-(4'-ethylphenylindenyl)zirconium dichloride dimethylsilanediyl(2,5-dimethyl-6-thiapentalene)(2-methyl-4-(4'-ethylphenylindenyl)zirconium dichloride dimethylsilanediyl(2-methyl-4-oxapentalene)(2-methyl-4-(4'-ethylphenylindenyl)zirconium dichloride dimethylsilanediyl(2-methyl-5-oxapentalene)(2-methyl-4-(4'-ethylphenylindenyl)zirconium dichloride dimethylsilanediyl(2-methyl-6-oxapentalene)(2-methyl-4-(4'-ethylphenylindenyl)zirconium dichloride dimethylsilanediyl(2,5-dimethyl-4-oxapentalene)(2-methyl-4-(4'-ethylphenylindenyl)zirconium dichloride dimethylsilanediyl(2,5-dimethyl-6-oxapentalene)(2-methyl-4-(4'-ethylphenylindenyl)zirconium dichloride dimethylsilanediyl(2-methyl-4-azapentalene)(2-methyl-4-(4'-n-propylphenylindenyl)zirconium dichloride dimethylsilanediyl(2-methyl-5-azapentalene)(2-methyl-4-(4'-n-propylphenylindenyl)zirconium dichloride dimethylsilanediyl(2-methyl-6-azapentalene)(2-methyl-4-(4'-n-propylphenylindenyl)zirconium dichloride dimethylsilanediyl(2-methyl-N-phenyl-4-azapentalene)(2-methyl-4-(4'-n-propylphenylindenyl)zirconium dichloride dimethylsilanediyl(2-methyl-N-phenyl-5-azapentalene)(2-methyl-4-(4'-n-propylphenylindenyl)zirconium dichloride dimethylsilanediyl(2-methyl-N-phenyl-6-azapentalene)(2-methyl-4-(4'-n-propylphenylindenyl)zirconium dichloride dimethylsilanediyl(2,5-dimethyl-N-azapentalene)(2-methyl-4-(4'-n-propylphenylindenyl)zirconium dichloride dimethylsilanediyl(2,5-dimethyl-6-azapentalene)(2-methyl-4-(4'-n-propylphenylindenyl)zirconium dichloride dimethylsilanediyl(2,5-dimethyl-N-phenyl-4-azapentalene)(2-methyl-4-(4'-n-propylphenylindenyl)zirconium dichloride dimethylsilanediyl(2,5-dimethyl-N-phenyl-6-azapentalene)(2-methy4-(4'-n-propylphenylindenyl)zirconium dichloride dimethylsilanediyl(2-methyl-4-thiapentalene)(2-methyl-4-(4'-n-propylphenylindenyl)zirconium dichloride dimethylsilanediyl(2-methyl-5-thiapentalene)(2-methyl-4-(4'-n-propylphenylindenyl)zirconium dichloride dimethylsilanediyl(2-methyl-6-thiapentalene)(2-methyl-4-(4'-n-propylphenylindenyl)zirconium dichloride dimethylsilanediyl(2,5-dimethyl-4-thiapentalene)(2-methyl-4-(4'-n-propylphenylindenyl)zirconium dichloride dimethylsilanediyl(2,5-dimethyl-6-thiapentalene)(2-methyl-4-(4'-n-propylphenylindenyl)zirconium dichloride dimethylsilanediyl(2-methyl-4-oxapentalene)(2-methyl-4-(4'-n-propylphenylindenyl)zirconium dichloride dimethylsilanediyl(2-methyl-5-oxapentalene)(2-methyl-4-(4'-n-propylphenylindenyl)zirconium dichloride dimethylsilanediyl(2-methyl-6-oxapentalene)(2-methyl-4-(4'-n-propylphenylindenyl)zirconium dichloride dimethylsilanediyl(2,5-dimethyl-4-oxapentalene)(2-methyl-4-(4'-n-propylphenylindenyl)zirconium dichloride dimethylsilanediyl(2,5-dimethyl-6-oxapentalene)(2-methyl-4-(4'-n-propylphenylindenyl)zirconium dichloride dimethylsilanediyl(2-methyl-4-azapentalene)(2-methyl-4-(4'-isopropylphenylindenyl)zirconium dichloride dimethylsilanediyl(2-methyl-5-azapentalene)(2-methyl-4-(4'-isopropylphenylindenyl)zirconium dichloride
dimethylsilanediyl(2-methyl-6-azapentalene)(2-methyl-4-(4'-isopropylphenylindenyl)zirconium dichloride
dimethylsilanediyl(2-methyl-N-phenyl-4-azapentalene)(2-methyl-4-(4'-isopropylphenylindenyl)zirconium dichloride
dimethylsilanediyl(2-methyl-N-phenyl-5-azapentalene)(2-methyl-4-(4'-isopropylphenylindenyl)zirconium dichloride
dimethylsilanediyl(2-methyl-N-phenyl-6-azapentalene)(2-methyl-4-(4'-isopropylphenylindenyl)zirconium dichloride
dimethylsilanediyl(2,5-dimethyl-4-azapentalene)(2-methyl-4-(4'-isopropylphenylindenyl)zirconium dichloride
dimethylsilanediyl(2,5-dimethyl-6-azapentalene)(2-methyl-4-(4'-isopropylphenylindenyl)zirconium dichloride
dimethylsilanediyl(2,5-dimethyl-N-phenyl-4-azapentalene)(2-methyl-4-(4'-isopropylphenylindenyl)zirconium dichloride
dimethylsilanediyl(2,5-dimethyl-N-phenyl-6-azapentalene)(2-methyl-4-(4'-isopropylphenylindenyl)zirconium dichloride
dimethylsilanediyl(2-methyl-4-thiapentalene)(2-methyl-4-(4'-isopropylphenylindenyl)zirconium dichloride
dimethylsilanediyl(2-methyl-5-thiapentalene)(2-methyl-4-(4'-isopropylphenylindenyl)zirconium dichloride
dimethylsilanediyl(2-methyl-6-thiapentalene)(2-methyl-4-(4'-isopropylphenylindenyl)zirconium dichloride
dimethylsilanediyl(2,5-dimethyl-4-thiapentalene)(2-methyl-4-(4'-isopropylphenylindenyl)zirconium dichloride
dimethylsilanediyl(2,5-dimethyl-6-thiapentalene)(2-methyl-4-(4'-isopropylphenylindenyl)zirconium dichloride
dimethylsilanediyl(2-methyl-4-oxapentalene)(2-methyl-4-(4'-isopropylphenylindenyl)zirconium dichloride
dimethylsilanediyl(2-methyl-5-oxapentalene)(2-methyl-4-(4'-isopropylphenylindenyl)zirconium dichloride
dimethylsilanediyl(2-methyl-6-oxapentalene)(2-methyl-4-(4'-isopropylphenylindenyl)zirconium dichloride
dimethylsilanediyl(2,5-dimethyl-4-oxapentalene)(2-methyl-4-(4'-isopropylphenylindenyl)zirconium dichloride
dimethylsilanediyl(2,5-dimethyl-6-oxapentalene)(2-methyl-4-(4'-isopropylphenylindenyl)zirconium dichloride
dimethylsilanediyl(2-methyl-4-azapentalene)(2-methyl-4-(4'-n-butylphenylindenyl)zirconium dichloride
dimethylsilanediyl(2-methyl-5-azapentalene)(2-methyl-4-(4'-n-butylphenylindenyl)zirconium dichloride
dimethylsilanediyl(2-methyl-6-azapentalene)(2-methyl-4-(4'-n-butylphenylindenyl)zirconium dichloride
dimethylsilanediyl(2-methyl-N-phenyl-4-azapentalene)(2-methyl-4-(4'-n-butylphenylindenyl)zirconium dichloride
dimethylsilanediyl(2-methyl-N-phenyl-5-azapentalene)(2-methyl-4-(4'-n-butylphenylindenyl)zirconium dichloride
dimethylsilanediyl(2-methyl-N-phenyl-6-azapentalene)(2-methyl-4-(4'-n-butylphenylindenyl)zirconium dichloride
dimethylsilanediyl(2,5-dimethyl-4-azapentalene)(2-methyl-4-(4'-n-butylphenylindenyl)zirconium dichloride
dimethylsilanediyl(2,5-dimethyl-6-azapentalene)(2-methyl-4-(4'-n-butylphenylindenyl)zirconium dichloride
dimethylsilanediyl(2,5-dimethyl-N-phenyl-4-azapentalene)(2-methyl-4-(4'-n-butylphenylindenyl)zirconium dichloride
dimethylsilanediyl(2,5-dimethyl-N-phenyl-6-azapentalene)(2-methyl-4-(4'-n-butylphenylindenyl)zirconium dichloride
dimethylsilanediyl(2-methyl-4-thiapentalene)(2-methyl-4-(4'-n-butylphenylindenyl)zirconium dichloride
dimethylsilanediyl(2-methyl-5-thiapentalene)(2-methyl-4-(4'-n-butylphenylindenyl)zirconium dichloride
dimethylsilanediyl(2-methyl-6-thiapentalene)(2-methyl-4-(4'-n-butylphenylindenyl)zirconium dichloride
dimethylsilanediyl(2,5-dimethyl-4-thiapentalene)(2-methyl-4-(4'-n-butylphenylindenyl)zirconium dichloride
dimethylsilanediyl(2,5-dimethyl-6-thiapentalene)(2-methyl-4-(4'-n-butylphenylindenyl)zirconium dichloride
dimethylsilanediyl(2-methyl-4-oxapentalene)(2-methyl-4-(4'-n-butylphenylindenyl)zirconium dichloride
dimethylsilanediyl(2-methyl-5-oxapentalene)(2-methyl-4-(4'-n-butylphenylindenyl)zirconium dichloride
dimethylsilanediyl(2-methyl-6-oxapentalene)(2-methyl-4-(4'-n-butylphenylindenyl)zirconium dichloride
dimethylsilanediyl(2,5-dimethyl-4-oxapentalene)(2-methyl-4-(4'-n-butylphenylindenyl)zirconium dichloride
dimethylsilanediyl(2,5-dimethyl-6-oxapentalene)(2-methyl-4-(4'-n-butylphenylindenyl)zirconium dichloride
dimethylsilanediyl(2-methyl-4-azapentalene)(2-methyl-4-(4'-s-butylphenylindenyl)zirconium dichloride
dimethylsilanediyl(2-methyl-5-azapentalene)(2-methyl-4-(4'-s-butylphenylindenyl)zirconium dichloride
dimethylsilanediyl(2-methyl-6-azapentalene)(2-methyl-4-(4'-s-butylphenylindenyl)zirconium dichloride
dimethylsilanediyl(2-methyl-N-phenyl-4-azapentalene)(2-methyl-4-(4'-s-butylphenylindenyl)zirconium dichloride
dimethylsilanediyl(2-methyl-N-phenyl-5-azapentalene)(2-methyl-4-(4'-s-butylphenylindenyl)zirconium dichloride
dimethylsilanediyl(2-methyl-N-phenyl-6-azapentalene)(2-methyl-4-(4'-s-butylphenylindenyl)zirconium dichloride
dimethylsilanediyl(2,5-dimethyl-4-azapentalene)(2-methyl-4-(4'-s-butylphenylindenyl)zirconium dichloride
dimethylsilanediyl(2,5-dimethyl-6-azapentalene)(2-methyl-4-(4'-s-butylphenylindenyl)zirconium dichloride
dimethylsilanediyl(2,5-dimethyl-N-phenyl-4-azapentalene)(2-methyl-4-(4'-s-butylphenylindenyl)zirconium dichloride
dimethylsilanediyl(2,5-dimethyl-N-phenyl-6-azapentalene)(2-methyl-4-(4'-s-butylphenylindenyl)zirconium dichloride dimethylsilanediyl(2-methyl-4-thiapentalene)(2-methyl-4-(4'-s-butylphenylindenyl)zirconium dichloride
dimethylsilanediyl(2-methyl-5-thiapentalene)(2-methyl-4-(4'-s-butylphenylindenyl)zirconium dichloride
dimethylsilanediyl(2-methyl-6-thiapentalene)(2-methyl-4-(4'-s-butylphenylindenyl)zirconium dichloride
dimethylsilanediyl(2,5-dimethyl-4thiapentalene)(2-methyl-4-(4'-s-butylphenylindenyl)zirconium dichloride
dimethylsilanediyl(2,5-dimethyl-6-thiapentalene)(2-methyl-4-(4'-s-butylphenylindenyl)zirconium dichloride
dimethylsilanediyl(2-methyl-4-oxapentalene)(2-methyl-4-(4'-s-butylphenylindenyl)zirconium dichloride
dimethylsilanediyl(2-methyl-5-oxapentalene)(2-methyl-4-(4'-s-butylphenylindenyl)zirconium dichloride
dimethylsilanediyl(2-methyl-6-oxapentalene)(2-methyl-4-(4'-s-butylphenylindenyl)zirconium dichloride
dimethylsilanediyl(2,5-dimethyl-4-oxapentalene)(2-methyl-4-(4'-s-butylphenylindenyl)zirconium dichloride
dimethylsilanediyl(2,5-dimethyl-6-oxapentalene)(2-methyl-4-(4'-s-butylphenylindenyl)zirconium dichloride
dimethylsilanediyl(2-methyl-4-azapentalene)(2-methyl-4-(4'-tert-butylphenylindenyl)zirconium dichloride
dimethylsilanediyl(2-methyl-5-azapentalene)(2-methyl-4-(4'-tert-butylphenylindenyl)zirconium dichloride
dimethylsilanediyl(2-methyl-6-azapentalene)(2-methyl-4-(4'-tert-butylphenylindenyl)zirconium dichloride
dimethylsilanediyl(2-methyl-N-phenyl-4-azapentalene)(2-methyl-4-(4'-tert-butylphenylindenyl)zirconium dichloride
dimethylsilanediyl(2-methyl-N-phenyl-5-azapentalene)(2-methyl-4-(4'-tert-butylphenylindenyl)zirconium dichloride
dimethylsilanediyl(2-methyl-N-phenyl-6-azapentalene)(2-methyl-4-(4'-tert-butylphenylindenyl)zirconium dichloride
dimethylsilanediyl(2,5-dimethyl-4-azapentalene)(2-methyl-4-(4'-tert-butylphenylindenyl)zirconium dichloride
dimethylsilanediyl(2,5-dimethyl-6-azapentalene)(2-methyl-4-(4'-tert-butylphenylindenyl)zirconium dichloride
dimethylsilanediyl(2,5-dimethyl-N-phenyl-4-azapentalene)(2-methyl-4-(4'-tert-butylphenylindenyl)zirconium dichloride
dimethylsilanediyl(2,5-dimethyl-N-phenyl-6-azapentalene)(2-methyl-4-(4'-tert-butylphenylindenyl)zirconium dichloride
dimethylsilanediyl(2-methyl-4-thiapentalene)(2-methyl-4-(4'-tert-butylphenylindenyl)zirconium dichloride
dimethylsilanediyl(2-methyl-5-thiapentalene)(2-methyl-4-(4'-tert-butylphenylindenyl)zirconium dichloride
dimethylsilanediyl(2-methyl-6-thiapentalene)(2-methyl-4-(4'-tert-butylphenylindenyl)zirconium dichloride
dimethylsilanediyl(2,5-dimethyl-4-thiapentalene)(2-methyl-4-(4'-tert-butylphenylindenyl)zirconium dichloride
dimethylsilanediyl(2,5-dimethyl-6-thiapentalene)(2-methyl-4-(4'-tert-butylphenylindenyl)zirconium dichloride
dimethylsilanediyl(2-methyl-4-oxapentalene)(2-methyl-4-(4'-tert-butylphenylindenyl)zirconium dichloride
dimethylsilanediyl(2-methyl-5-oxapentalene)(2-methyl-4-(4'-tert-butylphenylindenyl)zirconium dichloride
dimethylsilanediyl(2-methyl-6-oxapentalene)(2-methyl-4-(4'-tert-butylphenylindenyl)zirconium dichloride
dimethylsilanediyl(2,5-dimethyl-4-oxapentalene)(2-methyl-4-(4'-tert-butylphenylindenyl)zirconium dichloride
dimethylsilanediyl(2,5-dimethyl-6-oxapentalene)(2-methyl-4-(4'-tert-butylphenylindenyl)zirconium dichloride
dimethylsilanediyl(2-methyl-4-azapentalene)(2-methyl-4-(4'-n-pentylphenylindenyl)zirconium dichloride
dimethylsilanediyl(2-methyl-5-azapentalene)(2-methyl-4-(4'-n-pentylphenylindenyl)zirconium dichloride
dimethylsilanediyl(2-methyl-6-azapentalene)(2-methyl-4-(4'-n-pentylphenylindenyl)zirconium dichloride
dimethylsilanediyl(2-methyl-N-phenyl-4-azapentalene)(2-methyl-4-(4'-n-pentylphenylindenyl)zirconium dichloride
dimethylsilanediyl(2-methyl-N-phenyl-5-azapentalene)(2-methyl-4-(4'-n-pentylphenylindenyl)zirconium dichloride
dimethylsilanediyl(2-methyl-N-phenyl-6-azapentalene)(2-methyl-4-(4'-n-pentylphenylindenyl)zirconium dichloride
dimethylsilanediyl(2,5-dimethyl-4-azapentalene)(2-methyl-4-(4'-n-pentylphenylindenyl)zirconium dichloride
dimethylsilanediyl(2,5-dimethyl-6-azapentalene)(2-methyl-4-(4'-n-pentylphenylindenyl)zirconium dichloride
dimethylsilanediyl(2,5-dimethyl-N-phenyl-4-azapentalene)(2-methyl-4-(4'-n-pentylphenylindenyl)zirconium dichloride
dimethylsilanediyl(2,5-dimethyl-N-phenyl-6-azapentalene)(2-methyl-4-(4'-n-pentylphenylindenyl)zirconium dichloride
dimethylsilanediyl(2-methyl-4-thiapentalene)(2-methyl-4-(4'-n-pentylphenylindenyl)zirconium dichloride
dimethylsilanediyl(2-methyl-5-thiapentalene)(2-methyl-4-(4'-n-pentylphenylindenyl)zirconium dichloride
dimethylsilanediyl(2-methyl-6-thiapentalene)(2-methyl-4-(4'-n-pentylphenylindenyl)zirconium dichloride
dimethylsilanediyl(2,5-dimethyl-4-thiapentalene)(2-methyl-4-(4'-n-pentylphenylindenyl)zirconium dichloride
dimethylsilanediyl(2,5-dimethyl-6-thiapentalene)(2-methyl-4-(4'-n-pentylphenylindenyl)zirconium dichloride
dimethylsilanediyl(2-methyl-4-oxapentalene)(2-methyl-4-(4'-n-pentylphenylindenyl)zirconium dichloride
dimethylsilanediyl(2-methyl-5-oxapentalene)(2-methyl-4-(4'-n-pentylphenylindenyl)zirconium dichloride
dimethylsilanediyl(2-methyl-6-oxapentalene)(2-methyl-4-(4'-n-pentylphenylindenyl)zirconium dichloride
dimethylsilanediyl(2,5-dimethyl-4-oxapentalene)(2-methyl-4-(4'-n-pentylphenylindenyl)zirconium dichloride
dimethylsilanediyl(2,5-dimethyl-6-oxapentalene)(2-methyl-4-(4'-n-pentylphenylindenyl)zirconium dichloride dimethylsilanediyl(2-methyl-4-azapentalene)(2-methyl-4-(4'-n-hexylphenylindenyl)zirconium dichloride
dimethylsilanediyl(2-methyl-5-azapentalene)(2-methyl-4-(4'-n-hexylphenylindenyl)zirconium dichloride
dimethylsilanediyl(2-methyl-6-azapentalene)(2-methyl-4-(4'-n-hexylphenylindenyl)zirconium dichloride
dimethylsilanediyl(2-methyl-N-phenyl-4-azapentalene)(2-methyl-4-(4'-n-hexylphenylindenyl)zirconium dichloride
dimethylsilanediyl(2-methyl-N-phenyl-5-azapentalene)(2-methyl-4-(4'-n-hexylphenylindenyl)zirconium dichloride
dimethylsilanediyl(2-methyl-N-phenyl-6-azapentalene)(2-methyl-4-(4'-n-hexylphenylindenyl)zirconium dichloride
dimethylsilanediyl(2,5-dimethyl-4-azapentalene)(2-methyl-4-(4'-n-hexylphenylindenyl)zirconium dichloride
dimethylsilanediyl(2,5-dimethyl-6-azapentalene)(2-methyl-4-(4'-n-hexylphenylindenyl)zirconium dichloride
dimethylsilanediyl(2,5-dimethyl-N-phenyl-4-azapentalene)(2-methyl-4-(4'-n-hexylphenylindenyl)zirconium dichloride
dimethylsilanediyl(2,5-dimethyl-N-phenyl-6-azapentalene)(2-methyl-4-(4'-n-hexylphenylindenyl)zirconium dichloride
dimethylsilanediyl(2-methyl-4-thiapentalene)(2-methyl-4-(4'-n-hexylphenylindenyl)zirconium dichloride
dimethylsilanediyl(2-methyl-5-thiapentalene)(2-methyl-4-(4'-n-hexylphenylindenyl)zirconium dichloride
dimethylsilanediyl(2-methyl-6-thiapentalene)(2-methyl-4-(4'-n-hexylphenylindenyl)zirconium dichloride
dimethylsilanediyl(2,5-dimethyl-4-thiapentalene)(2-methyl-4-(4'-n-hexylphenylindenyl)zirconium dichloride
dimethylsilanediyl(2,5-dimethyl-6-thiapentalene)(2-methyl-4-(4'-n-hexylphenylindenyl)zirconium dichloride
dimethylsilanediyl(2-methyl-4-oxapentalene)(2-methyl-4-(4'-n-hexylphenylindenyl)zirconium dichloride
dimethylsilanediyl(2-methyl-5-oxapentalene)(2-methyl-4-(4'-n-hexylphenylindenyl)zirconium dichloride
dimethylsilanediyl(2-methyl-6-oxapentalene)(2-methyl-4-(4'-n-hexylphenylindenyl)zirconium dichloride
dimethylsilanediyl(2,5-dimethyl-4-oxapentalene)(2-methyl-4-(4'-n-hexylphenylindenyl)zirconium dichloride
dimethylsilanediyl(2,5-dimethyl-6-oxapentalene)(2-methyl-4-(4'-n-hexylphenylindenyl)zirconium dichloride
dimethylsilanediyl(2-methyl-4-azapentalene)(2-methyl-4-(4'-cyclohexylphenylindenyl)zirconium dichloride
dimethylsilanediyl(2-methyl-5-azapentalene)(2-methyl-4-(4'-cyclohexylphenylindenyl)zirconium dichloride
dimethylsilanediyl(2-methyl-6-azapentalene)(2-methyl-4-(4'-cyclohexylphenylindenyl)zirconium dichloride
dimethylsilanediyl(2-methyl-N-phenyl-4-azapentalene)(2-methyl-4-(4'-cyclohexylphenylindenyl)zirconium dichloride
dimethylsilanediyl(2-methyl-N-phenyl-5-azapentalene)(2-methyl-4-(4'-cyclohexylphenylindenyl)zirconium dichloride
dimethylsilanediyl(2-methyl-N-phenyl-6-azapentalene)(2-methyl-4-(4'-cyclohexylphenylindenyl)zirconium dichloride
dimethylsilanediyl(2,5-dimethyl-4-azapentalene)(2-methyl-4-(4'-cyclohexylphenylindenyl)zirconium dichloride
dimethylsilanediyl(2,5-dimethyl-6-azapentalene)(2-methyl-4-(4'-cyclohexylphenylindenyl)zirconium dichloride
dimethylsilanediyl(2,5-dimethyl-N-phenyl-4-azapentalene)(2-methyl-4-(4'-cyclohexylphenylindenyl)zirconium dichloride
dimethylsilanediyl(2,5-dimethyl-N-phenyl-6-azapentalene)(2-methyl-4-(4'-cyclohexylphenylindenyl)zirconium dichloride
dimethylsilanediyl(2-methyl-4-thiapentalene)(2-methyl-4-(4'-cyclohexylphenylindenyl)zirconium dichloride
dimethylsilanediyl(2-methyl-5-thiapentalene)(2-methyl-4-(4'-cyclohexylphenylindenyl)zirconium dichloride
dimethylsilanediyl(2-methyl-6-thiapentalene)(2-methyl-4-(4'-cyclohexylphenylindenyl)zirconium dichloride
dimethylsilanediyl(2,5-dimethyl-4-thiapentalene)(2-methyl-4-(4'-cyclohexylphenylindenyl)zirconium dichloride
dimethylsilanediyl(2,5-dimethyl-6-thiapentalene)(2-methyl-4-(4'-cyclohexylphenylindenyl)zirconium dichloride
dimethylsilanediyl(2-methyl-4-oxapentalene)(2-methyl-4-(4'-cyclohexylphenylindenyl)zirconium dichloride
dimethylsilanediyl(2-methyl-5-oxapentalene)(2-methyl-4-(4'-cyclohexylphenylindenyl)zirconium dichloride
dimethylsilanediyl(2-methyl-6-oxapentalene)(2-methyl-4-(4'-cyclohexylphenylindenyl)zirconium dichloride
dimethylsilanediyl(2,5-dimethyl-4-oxapentalene)(2-methyl-4-(4'-cyclohexylphenylindenyl)zirconium dichloride
dimethylsilanediyl(2,5-dimethyl-6-oxapentalene)(2-methyl-4-(4'-cyclohexylphenylindenyl)zirconium dichloride
dimethylsilanediyl(2-methyl-4-azapentalene)(2-methyl-4-(4'-trimethylsilylphenylindenyl)zirconium dichloride
dimethylsilanediyl(2-methyl-5-azapentalene)(2-methyl-4-(4'-trimethylsilylphenylindenyl)zirconium dichloride
dimethylsilanediyl(2-methyl-6-azapentalene)(2-methyl-4-(4'-trimethylsilylphenylindenyl)zirconium dichloride
dimethylsilanediyl(2-methyl-N-phenyl-4-azapentalene)(2-methyl-4-(4'-trimethylsilylphenylindenyl)zirconium dichloride
dimethylsilanediyl(2-methyl-N-phenyl-5-azapentalene)(2-methyl-4-(4'-trimethylsilylphenylindenyl)zirconium dichloride
dimethylsilanediyl(2-methyl-N-phenyl-6-azapentalene)(2-methyl-4-(4'-trimethylsilylphenylindenyl)zirconium dichloride
dimethylsilanediyl(2,5-dimethyl-4-azapentalene)(2-methyl-4-(4'-trimethylsilylphenylindenyl)zirconium dichloride
dimethylsilanediyl(2,5-dimethyl-6-azapentalene)(2-methyl-4-(4'-trimethylsilylphenylindenyl)zirconium dichloride
dimethylsilanediyl(2,5-dimethyl-N-phenyl-4-azapentalene)(2-methyl-4-(4'-trimethylsilylphenylindenyl)zirconium dimethylsilanediyl(2,5-dimethyl-N-phenyl-6-azapentalene)(2-methyl-4-(4'-trimethylsilylphenylindenyl)zirconium dichloride
dimethylsilanediyl(2-methyl-4-thiapentalene)(2-methyl-4-(4'-trimethylsilylphenylindenyl)zirconium dichloride
dimethylsilanediyl(2-methyl-5-thiapentalene)(2-methyl-4-(4'-trimethylsilylphenylindenyl)zirconium dichloride
dimethylsilanediyl(2-methyl-6-thiapentalene)(2-methyl-4-(4'-trimethylsilylphenylindenyl)zirconium dichloride
dimethylsilanediyl(2,5-dimethyl-4-thiapentalene)(2-methyl-4-(4'-trimethylsilylphenylindenyl)zirconium dichloride
dimethylsilanediyl(2,5-dimethyl-6-thiapentalene)(2-methyl-4-(4'-trimethysilylphenylindenyl)zirconium dichloride
dimethylsilanediyl(2-methyl-4-oxapentalene)(2-methyl-4-(4'-trimethylsilylphenylindenyl)zirconium dichloride
dimethylsilanediyl(2-methyl-5-oxapentalene)(2-methyl-4-(4'-trmethylsilylphenylindenyl)zirconium dichloride
dimethylsilanediyl(2-methyl-6-oxapentalene)(2-methyl-4-(4'-trimethylsilylphenylindenyl)zirconium dichloride
dimethylsilanediyl(2,5-dimethyl-4-oxapentalene)(2-methyl-4-(4'-trimethylsilylphenylindenyl)zirconium dichloride
dimethylsilanediyl(2,5-dimethyl-6-oxapentalene)(2-methyl-4-(4'-trimethylsilylphenylindenyl)zirconium dichloride
dimethylsilanediyl(2-methyl-4-azapentalene)(2-methyl-4-(4'-adamantylphenylindenyl)zirconium dichloride
dimethylsilanediyl(2-methyl-5-azapentalene)(2-methyl-4-(4'-adamantylphenylindenyl)zirconium dichloride
dimethylsilanediyl(2-methyl-6-azapentalene)(2-methyl-4-(4'-adamantylphenylindenyl)zirconium dichloride
dimethylsilanediyl(2-methyl-N-phenyl-4-azapentalene)(2-methyl-4-(4'-adamantylphenylindenyl)zirconium dichloride
dimethylsilanediyl(2-methyl-N-phenyl-5-azapentalene)(2-methyl-4-(4'-adamantylphenylindenyl)zirconium dichloride
dimethylsilanediyl(2-methyl-N-phenyl-6-azapentalene)(2-methyl-4-(4'-adamantylphenylindenyl)zirconium dichloride
dimethylsilanediyl(2,5-dimethyl-4-azapentalene)(2-methyl-4-(4'-adamantylphenylindenyl)zirconium dichloride
dimethylsilanediyl(2,5-dimethyl-6-azapentalene)(2-methyl-4-(4'-adamantylphenylindenyl)zirconium dichloride
dimethylsilanediyl(2,5-methyl-4-azapentalene)(2-methyl-4-(4'-adamantylphenylindenyl)zirconium dichloride
dimethylsilanediyl(2,5-dimethyl-N-phenyl-4-azapentalene)(2-methyl-4-(4'-adamantylphenylindenyl)zirconium dichloride
dimethylsilanediyl(2,5-dimethyl-N-phenyl-6-azapentalene)(2-methyl-4-(4'-adamantylphenylindenyl)zirconium dichloride
dimethylsilanediyl(2-methyl-4-thiapentalene)(2-methyl-4-(4'-adamantylphenylindenyl)zirconium dichloride
dimethylsilanediyl(2-methyl-5-thiapentalene)(2-methyl-4-(4'-adamantylphenylindenyl)zirconium dichloride
dimethylsilanediyl(2-methyl-6-thiapentalene)(2-methyl-4-(4'-adamantylphenylindenyl)zirconium dichloride
dimethylsilanediyl(2,5-dimethyl-4-thiapentalene)(2-methyl-4-(4'-adamantylphenylindenyl)zirconium dichloride
dimethylsilanediyl(2,5-dimethyl-6-thiapentalene)(2-methyl-4-(4'-adamantylphenylindenyl)zirconium dichloride
dimethylsilanediyl(2-methyl-4-oxapentalene)(2-methyl-4-(4'-adamantylphenylindenyl)zirconium dichloride
dimethylsilanediyl(2-methyl-5-oxapentalene)(2-methyl-4-(4'-adamantylphenylindenyl)zirconium dichloride
dimethylsilanediyl(2-methyl-6-oxapentalene)(2-methyl-4-(4'-adamantylphenylindenyl)zirconium dichloride
dimethylsilanediyl(2,5-dimethyl-4-oxapentalene)(2-methyl-4-(4'-adamantylphenylindenyl)zirconium dichloride
dimethylsilanediyl(2,5-dimethyl-6-oxapentalene)(2-methyl-4-(4'-adamantylphenylindenyl)zirconium dichloride
dimethylsilanediyl(2-methyl-4-azapentalene)(2-methyl-4-(4'-tris(trifluoromethyl)methylphenylindenyl)zirconium dichloride
dimethylsilanediyl(2-methyl-5-azapentalene)(2-methyl-4-(4'-tris(trifluoromethyl)methylphenylindenyl)zirconium dichloride
dimethylsilanediyl(2-methyl-6-azapentalene)(2-methyl-4-(4'-tris(trifluoromethyl)methylphenylindenyl)zirconium dichloride
dimethylsilanediyl(2-methyl-N-phenyl-4-azapentalene)(2-methyl-4-(4'-tris(trifluoromethyl)methylphenylindenyl)zirconium dichloride
dimethylsilanediyl(2-methyl-N-phenyl-5-azapentalene)(2-methyl-4-(4'-tris(trifluoromethyl)methylphenylindenyl)zirconium dichloride
dimethylsilanediyl(2-methyl-N-phenyl-6-azapentalene)(2-methyl-4-(4'-tris(trifluoromethyl)methylphenylindenyl)zirconium dichloride
dimethylsilanediyl(2,5-dimethyl-4-azapentalene)(2-methyl-4-(4'-tris(trifluoromethyl)methylphenylindenyl)zirconium dichloride
dimethylsilanediyl(2,5-dimethyl-6-azapentalene)(2-methyl-4-(4'-tris(trifluoromethyl)methylphenylindenyl)zirconium dichloride
dimethylsilanediyl(2,5-dimethyl-N-phenyl-4-azapentalene)(2-methyl-4-(4'-tris(trifluoromethyl)methylphenylindenyl)zirconium dichloride
dimethylsilanediyl(2,5-dimethyl-N-phenyl-6-azapentalene)(2-methyl-4-(4'-tris(trifluoromethyl)methylphenylindenyl)zirconium dichloride
dimethylsilanediyl(2-methyl-4-thiapentalene)(2-methyl-4-(4'-tris(trifluoromethyl)methylphenylindenyl)zirconium dichloride
dimethylsilanediyl(2-methyl-5-thiapentalene)(2-methyl-4-(4'-tris(trifluoromethyl)methylphenylindenyl)zirconium dichloride
dimethylsilanediyl(2-methyl-6-thiapentalene)(2-methyl-4-(4'-tris(trifluoromethyl)methylphenylindenyl)zirconium dichloride
dimethylsilanediyl(2,5-dimethyl-4-thiapentalene)(2-methyl-4-(4'-tris(trifluoromethyl)methylphenylindenyl)zirconium dichloride
dimethylsilanediyl(2,5-dimethyl-6-thiapentalene)(2-methyl-4-(4'-tris(trifluoromethyl)methylphenylindenyl)zirconium dichloride dimethylsilanediyl(2-methyl-4-oxapentalene)(2-methyl-4-(4'-tris(trifluoromethyl)methylphenylindenyl)zirconium dichloride dimethylsilanediyl(2-methyl-5-oxapentalene)(2-methyl-4-(4'-tris(trifluoromethyl)methylphenylindenyl)zirconium dichloride dimethylsilanediyl(2-methyl-6-oxapentalene)(2-methyl-4-(4'-tris(trifluoromethyl)methylphenylindenyl)zirconium dichloride dimethylsilanediyl(2,5-dimethyl-4-oxapentalene)(2-methyl-4-(4'-tris(trifluoromethyl)methylphenylindenyl)zirconium dichloride dimethylsilanediyl(2,5-dimethyl-6-oxapentalene)(2-methyl-4-(4'-tris(trifluoromethyl)methylphenylindenyl)zirconium dichloride dimethylsilanediyl(2-methyl-4-azapentalene)(2-ethyl-4-(4'-tert-butylphenylindenyl)zirconium dichloride dimethylsilanediyl(2-methyl-5,6-dihydro-4-azapentalene)(2-ethyl-4-(4'-tert-butylphenylindenyl)zirconium dichloride dimethylsilanediyl(2-methyl-4-azapentalene)(2-ethyl-4-(4'-tert-butylphenylindenyl)zirconium dichloride dimethylsilanediyl(2-methyl-5-azapentalene)(2-n-butyl-4-(4'-tert-butylphenylindenyl)zirconium dichloride ethylidene(2-methyl-6-azapentalene)(2-methyl-4-(4'-tert-butylphenylindenyl)zirconium dichloride dimethylsilanediyl(2-methyl-N-trimethylsilyl-4-azapentalene)(2-methyl-4-(4'-tert-butylphenylindenyl)zirconium dichloride dimethylsilanediyl(2-methyl-N-tolyl-5-azapentalene)(2-n-propyl-4-(4'-tert-butylphenylindenyl)zirconium dichloride dimethylgermyldiyl(2-methyl-N-phenyl-6-azapentalene)(2-methyl-4-(4'-tert-butylphenylindenyl)zirconium dichloride methylethylidene(2,5-dimethyl-4-azapentalene)(2-methyl-4-(4'-tert-butylphenylindenyl)zirconium dichloride dimethylsilanediyl(2,5-diisopropyl-6-azapentalene)(2-methyl-4-(4'-tert-butylphenylindenyl)zirconium dichloride dimethylsilanediyl(2,5-dimethyl-N-phenyl-4-azapentalene)(2,6-dimethyl-4-(4'-tert-butylphenylindenyl)zirconium dichloride dimethylsilanediyl(2,5-dimethyl-N-phenyl-6-azapentalene)(2-methyl-4-(6'-tert-butylnaphthylindenyl)zirconium dichloride dimethylsilanediyl(2,5-dimethyl-N-phenyl-6-azapentalene)(2-methyl4-(6'-tert-butyl-anthracenylindenyl)zirconium dichloride dimethylsilanediyl(2-methyl-4-phosphapentalene)(2-methyl-4-(4'-tert-butylphenylindenyl)zirconium dichloride diphenylsilanediyl(2-methyl-5-thiapentalene)(2-methyl-4-(4'-tert-butylphenylindenyl)zirconium dichloride methylphenylsilanediyl(2-methyl-6-thiapentalene)(2-methyl-4-(4'-tert-butylphenylindenyl)zirconium dichloride methylidene(2,5-dimethyl-4-thiapentalene)(2-methyl-4-(4'-tert-butylphenylindenyl)zirconium dichloride dimethylmethylidene(2,5-dimethyl-6-thiapentalene)(2-methyl-4-(4'-tert-butylphenylindenyl)zirconium dichloride diphenylsilanediyl(2,5-dimethyl-4-oxapentalene)(2-methyl-4-(4'-tert-butylphenylindenyl)zirconium dichloride diphenylsilanediyl(2,5-dimethyl-6-oxapentalene)(2-methyl-4-(4'-tert-butylphenylindenyl)zirconium dichloride dimethylsilanediyl(2-methyl-4-azapentalene)(2-methylindenyl)zirconium dichloride dimethylsilanediyl(2-methyl-5-azapentalene)(2-methylindenyl)zirconium dichloride dimethylsilanediyl(2-methyl-6-azapentalene)(2-methylindenyl)zirconium dichloride dimethylsilanediyl(2-methyl-N-phenyl-4-azapentalene)(2-methylindenyl)zirconium dichloride dimethylsilanediyl(2-methyl-N-phenyl-5-azapentalene)(2-methylindenyl)zirconium didichloride dimethylsilanediyl(2-methyl-N-phenyl-6-azapentalene)(2-methylindenyl)zirconium dichloride dimethylsilanediyl(2,5-dimethyl-4-azapentalene)(2-methylindenyl)zirconium dichloride dimethylsilanediyl(2,5-dimethyl-6-azapentalene)(2-methylindenyl)zirconium dichloride dimethylsilanediyl(2,5-dimethyl-N-phenyl-4-azapentalene)(2-methylindenyl)zirconium dichloride dimethylsilanediyl(2,5-dimethyl-N-phenyl-6-azapentalene)(2-methylindenyl)zirconium dichloride dimethylsilanediyl(2-methyl-4-thiapentalene)(2-methylindenyl)zirconium dichloride dimethylsilanediyl(2-methyl-5-thiapentalene)(2-methylindenyl)zirconium dichloride dimethylsilanediyl(2-methyl-6-thiapentalene)(2-methylindenyl)zirconium dichloride dimethylsilanediyl(2,5-dimethyl-4-thiapentalene)(2-methylindenyl)zirconium dichloride dimethylsilanediyl(2,5-dimethyl-6-thiapentalene)(2-methylindenyl)zirconium dichloride dimethylsilanediyl(2-methyl-4-oxapentalene)(2-methylindenyl)zirconium dichloride dimethylsilanediyl(2-methyl-5-oxapentalene)(2-methylindenyl)zirconium dichlonde dimethylsilanediyl(2-methyl-6-oxapentalene)(2-methylindenyl)zirconium dichloride dimethylsilanediyl(2,5-dimethyl-4-oxapentalene)(2-methylindenyl)zirconium dichloride dimethylsilanediyl(2,5-dimethyl-6-oxapentalene)(2-methylindenyl)zirconium dichloride dimethylsilanediyl(2-methyl-4-azapentalene)(indenyl)zirconium dichloride dimethylsilanediyl(2-methyl-5-azapentalene)(indenyl)zirconium dichloride dimethylsilanediyl(2-methyl-6-azapentalene)(indenyl)zirconium dichloride dimethylsilanediyl(2-methyl-N-phenyl-4-azapentalene)(indenyl)zirconium dichloride dimethylsilanediyl(2-methyl-N-phenyl-5-azapentalene)(indenyl)zirconium dichloride dimethylsilanediyl(2-methyl-N-phenyl-6-azapentalene)(indenyl)zirconium dichloride dimethylsilanediyl(2,5-dimethyl-4-azapentalene)(indenyl)zirconium dichloride dimethylsilanediyl(2,5-dimethyl-6-azapentalene)(indenyl)zirconium dichloride dimethylsilanediyl(2,5-dimethyl-N-phenyl-4-azapentalene)(indenyl)zirconium dichloride
dimethylsilanediyl(2,5-dimethyl-N-phenyl-6-azapentalene)(indenyl)zirconium dichloride
dimethylsidanediyl(2-methyl-4-thiapentalene)(indenyl)zirconium dichloride
dimethylsilanediyl(2-methyl-5-thiapentalene)(indenyl)zirconium dichloride
dimethylsilanediyl(2-methyl-6-thiapentalene)(indenyl)zirconium dichloride
dimethylsilanediyl(2,5-dimethyl-4-thiapentalene)(indenyl)zirconium dichloride
dimethylsilanediyl(2,5-dimethyl-6-thiapentalene)(indenyl)zirconium dichloride
dimethylsilanediyl(2-methyl-4-oxapentalene)(indenyl)zirconium dichloride
dimethylsilanediyl(2-methyl-5-oxapentalene)(indenyl)zirconium dichloride
dimethylsilanediyl(2-methyl-6-oxapentalene)(indenyl)zirconium dichloride
dimethylsilanediyl(2,5-dimethyl-4-oxapentalene)(indenyl)zirconium dichloride
dimethylsilanediyl(2,5-dimethyl-6-oxapentalene)(indenyl)zirconium dichloride
dimethylsilanediyl(2-methyl-4-azapentalene)(2-methyl-4-phenylindenyl)zirconium dichloride
dimethylsilanediyl(2-methyl-5-azapentalene)(2-methyl-4-phenylindenyl)zirconium dichloride
dimethylsilanediyl(2-methyl-6-azapentalene)(2-methyl-4-phenylindenyl)zirconium dichloride
dimethylsilanediyl(2-methyl-N-phenyl-4-azapentalene)(2-methyl-4-phenylindenyl)zirconium dichloride
dimethylsilanediyl(2-methyl-N-phenyl-5-azapentalene)(2-methyl-4-phenylindenyl)zirconium dichloride
dimethylsilanediyl(2-methyl-N-phenyl-6-azapentalene)(2-methyl-4-phenylindenyl)zirconium dichloride
dimethylsilanediyl(2,5-dimethyl-4-azapentalene)(2-methyl-4-phenylindenyl)zirconium dichloride
dimethylsilanediyl(2,5-dimethyl-6-azapentalene)(2-methyl-4-phenylindenyl)zirconium dichloride
dimethylsilanediyl(2,5-dimethyl-N-phenyl-4-azapentalene)(2-methyl-4-phenylindenyl)zirconium dichloride
dimethylsilanediyl(2,5-dimethyl-N-phenyl-6-azapentalene)(2-methyl-4-phenylindenyl)zirconium dichloride
dimethylsilanediyl(2-methyl-4-thiapentalene)(2-methyl-4-phenylindenyl)zirconium dichloride
dimethylsilanediyl(2-methyl-5-thiapentalene)(2-methyl-4-phenylindenyl)zirconium dichloride
dimethylsilanediyl(2-methyl-6-thiapentalene)(2-methyl-4-phenylindenyl)zirconium dichloride
dimethylsilanediyl(2,5-dimethyl-4-thiapentalene)(2-methyl-4-phenylindenyl)zirconium dichloride
dimethylsilanediyl(2,5-dimethyl-6-thiapentalene)(2-methyl-4-phenylindenyl)zirconium dichloride
dimethylsilanediyl(2-methyl-4-oxapentalene)(2-methyl-4-phenylindenyl)zirconium dichloride
dimethylsilanediyl(2-methyl-5-oxapentalene)(2-methyl-4-phenylindenyl)zirconium dichloride
dimethylsilanediyl(2-methyl-6-oxapentalene)(2-methyl-4-phenylindenyl)zirconium dichloride
dimethylsilanediyl(2,5-dimethyl-4-oxapentalene)(2-methyl-4-phenylindenyl)zirconium dichloride
dimethylsilanediyl(2,5-dimethyl-6-oxapentalene)(2-methyl-4-phenylindenyl)zirconium dichloride
dimethylsilanediyl(2-methyl-4-azapentalene)(2-methyl-4,5-benzindenyl)zirconium dichloride
dimethylsilanediyl(2-methyl-5-azapentalene)(2-methyl-4,5-benzindenyl)zirconium dichloride
dimethylsilanediyl(2-methyl-6-azapentalene)(2-methyl-4,5-benzindenyl)zirconium dichloride
dimethylsilanediyl(2-methyl-N-phenyl-4-azapentalene)(2-methyl-4,5-benzindenyl)zirconium dichloride
dimethylsilanediyl(2-methyl-N-phenyl-5-azapentalene)(2-methyl-4,5-benzindenyl)zirconium dichloride
dimethylsilanediyl(2-methyl-N-phenyl-6-azapentalene)(2-methyl-4,5-benzindenyl)zirconium dichloride
dimethylsilanediyl(2,5-dimethyl-4-azapentalene)(2-methyl-4,5-benzindenyl)zirconium dichloride
dimethylsilanediyl(2,5-dimethyl-6-azapentalene)(2-methyl-4,5-benzindenyl)zirconium dichloride
dimethylsilanediyl(2,5-dimethyl-N-phenyl-4-azapentalene)(2-methyl-4,5-benzindenyl)zirconium dichloride
dimethylsilanediyl(2,5-dimethyl-N-phenyl-6-azapentalene)(2-methyl-4,5-benzindenyl)zirconium dichloride
dimethylsilanediyl(2-methyl-4-thiapentalene)(2-methyl-4,5-benzindenyl)zirconium dichloride
dimethylsilanediyl(2-methyl-5-thiapentalene)(2-methyl-4,5-benzindenyl)zirconium dichloride
dimethylsilanediyl(2-methyl-6-thiapentalene)(2-methyl-4,5-benzindenyl)zirconium dichloride
dimethylsilanediyl(2,5-dimethyl-4-thiapentalene)(2-methyl-4,5-benzindenyl)zirconium dichloride
dimethylsilanediyl(2,5-dimethyl-6-thiapentalene)(2-methyl-4,5-benzindenyl)zirconium dichloride
dimethylsilanediyl(2-methyl-4-oxapentalene)(2-methyl-4,5-benzindenyl)zirconium dichloride
dimethylsilanediyl(2-methyl-5-oxapentalene)(2-methyl-4,5-benzindenyl)zirconium dichloride
dimethylsilanediyl(2-methyl-6-oxapentalene)(2-methyl-4,5-benzindenyl)zirconium dichloride
dimethylsilanediyl(2,5-dimethyl-4-oxapentalene)(2-methyl-4,5-benzindenyl)zirconium dichloride
dimethylsilanediyl(2,5-dimethyl-6-oxapentalene)(2-methyl-4,5-benzindenyl)zirconium dichloride
dimethylsilanediylbis(2-methyl-4-azapentalene)zirconium dichloride
dimethylsilanediylbis(2-methyl-5-azapentalene)zirconium dichloride
dimethylsilanediylbis(2-methyl-6-azapentalene)zirconium dichloride
dimethylsilanediylbis(2-methyl-N-phenyl-4-azapentalene)zirconium dichloride
dimethylsilanediylbis(2-methyl-N-phenyl-5-azapentalene)zirconium dichloride
dimethylsilanediylbis(2-methyl-N-phenyl-6-azapentalene)zirconium dichloride
dimethylsilanediylbis(2,5-dimethyl-4-azapentalene)zirconium dichloride
dimethylsilanediylbis(2,5-dimethyl-6-azapentalene)zirconium dichloride dimethylsilanediylbis(2,5-dimethyl-N-phenyl-4-azapentalene)zirconium dichloride
dimethylsilanediylbis(2,5-dimethyl-N-phenyl-6-azapentalene)zirconium dichloride
dimethylsilanediylbis(2-methyl-4-thiapentalene) zirconium dichloride
dimethylsilanediylbis(2-methyl-5-thiapentalene) zirconium dichloride
dimethylsilanediylbis(2-methyl-6-thiapentalene) zirconium dichloride
dimethylsilanediylbis(2,5-dimethyl-4-thiapentalene) zirconium dichloride
dimethylsilanediylbis(2,5-dimethyl-6-thiapentalene) zirconium dichloride
dimethylsilanediylbis(2-methyl-4-oxapentalene) zirconium dichloride
dimethylsilanediylbis(2-methyl-5-oxapentalene) zirconium dichloride
dimethylsilanediylbis(2-methyl-6-oxapentalene) zirconium dichloride
dimethylsilanediylbis(2,5-dimethyl-4-oxapentalene) zirconium dichloride
dimethylsilanediylbis(2,5-dimethyl-6-oxapentalene) zirconium dichloride or a mixture thereof.

13. A process for preparing a polyolefin by polymerization of one or more olefins in the presence of a catalyst system as claimed in claim 1.

14. The catalyst system as claimed in claim 1, wherein at least one of $R^1$ and $R^2$ is a $C_1$–$C_{40}$-group selected from $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloaylalkyl, $C_7$–$C_{40}$-alkylaryl and $C_7$–$C_{40}$-haloalkylaryl.

15. The catalyst system as claimed in claim 1, wherein $R^6$ is a $C_1$–$C_{40}$-group selected from $C_1$–$C_{20}$-alkyl, $C_6$–$C_{40}$-aryl, $C_7$–$C_{40}$-arylalkyl and $C_7$–$C_{40}$-alkylaryl.

16. The catalyst system as claimed in claim 9, wherein $M^1$ is Ti, Zr or Hf.

17. The catalyst system as claimed in claim 9, wherein $R^{12}$ is a $C_1$–$C_{40}$-group selected from $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl and $C_8$–$C_{40}$-arylalkenyl.

18. The catalyst system as claimed in claim 9, wherein $R^7$ is a $C_1$–$C_{30}$-group selected from $C_1$–$C_{25}$-alkyl, $C_2$–$C_{25}$-alkenyl, $C_3$–$C_{15}$-alkylalkenyl, $C_6$–$C_{24}$-aryl, $C_5$–$C_{24}$-heteroaryl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl and $C_1$–$C_{12}$-alkoxy.

19. The catalyst system as claimed in claim 9, wherein R8 is $C_1$–$C_{30}$-group selected from $C_1$–$C_{25}$-alkyl, $C_2$–$C_{25}$-alkenyl, $C_3$–$C_{15}$-alkylalkenyl, $C_6$–$C_{24}$-aryl, $C_5$–$C_{24}$-heteroaryl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl and $C_1$–$C_{12}$-alkoxy.

20. The catalyst system as claimed in claim 9, wherein $L^1$ is $C_1$–$C_{10}$-alkyl or $C_6$–$C_{10}$-aryl.

21. The catalyst system as claimed in claim 10, where $R^{10}$ and $R^{11}$ are $C_1$–$C_{10}$-alkyl, $C_6$–$C_{14}$-aryl or trimethylsilyl.

* * * * *

UNITED STATES PATENT AND TRADEMARK OFFICE
CERTIFICATE OF CORRECTION

PATENT NO. : 6,482,902 B1
DATED : November 19, 2002
INVENTOR(S) : Bohnen et al.

It is certified that error appears in the above-identified patent and that said Letters Patent is hereby corrected as shown below:

Column 39,
Line 17, "$C_{1C10}$-alkyl" should be -- $C_1$-$C_{10}$-alkyl --.

Column 40,
Line 23, "prhylindenyl" should be -- diisopropylindenyl --;
Line 26, "disopropylindenyl" should be -- isopropylindenyl --.

Column 45,
Line 30, "methyl4" should be -- methyl-4 --.

Column 46,
Line 38, "methy4" should be -- methyl-4 --.

Column 49,
Line 7, "4thiapentalene" should be -- 4-thiapentalene --.

Column 53,
Line 20, "trmethylsilylphenylindenyl" should be -- trimethylsilylphenylindenyl --.

Column 55,
Line 52, "methyl4" should be -- methyl-4 --.

Column 60,
Line 20, "R8" should be -- $R^8$ --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,482,902 B1
DATED : November 19, 2002
INVENTOR(S) : Bohnen et al.

It is certified that error appears in the above-identified patent and that said Letters Patent is hereby corrected as shown below:

Column 39,
Line 17, "$C_{1C10}$-alkyl" should be -- $C_1$-$C_{10}$-alkyl --.

Column 40,
Line 23, "prhylindenyl" should be -- diisopropylindenyl --;
Line 26, "disopropylindenyl" should be -- isopropylindenyl --.

Column 45,
Line 30, "methyl4" should be -- methyl-4 --.

Column 46,
Line 38, "methy4" should be -- methyl-4 --.

Column 49,
Line 7, "4thiapentalene" should be -- 4-thiapentalene --.

Column 53,
Line 20, "trmethylsilylphenylindenyl" should be -- trimethylsilylphenylindenyl --.

Column 55,
Line 52, "methyl4" should be -- methyl-4 --.

Column 60,
Line 20, "R8" should be -- $R^8$ --.

Signed and Sealed this

Twenty-fifth Day of March, 2003

JAMES E. ROGAN
*Director of the United States Patent and Trademark Office*